US012682534B2

(12) United States Patent (10) Patent No.: US 12,682,534 B2
Li (45) Date of Patent: Jul. 14, 2026

(54) METHOD AND APPARATUS FOR RENDERING INTERACTION PICTURE, DEVICE, STORAGE MEDIUM, AND PROGRAM PRODUCT

(71) Applicant: Tencent Technology (Shenzhen) Company Limited, Shenzhen (CN)

(72) Inventor: Rui Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 118 days.

(21) Appl. No.: 18/769,909

(22) Filed: Jul. 11, 2024

(65) Prior Publication Data

US 2024/0362845 A1 Oct. 31, 2024

Related U.S. Application Data

(63) Continuation of application No. PCT/CN2023/088575, filed on Apr. 17, 2023.

(30) Foreign Application Priority Data

Jun. 7, 2022 (CN) .......................... 202210637623.4

(51) Int. Cl.
*G06T 13/40* (2011.01)
*G06T 7/246* (2017.01)
(Continued)

(52) U.S. Cl.
CPC .............. *G06T 13/40* (2013.01); *G06T 7/246* (2017.01); *G06T 15/20* (2013.01); *G06T 19/006* (2013.01);
(Continued)

(58) Field of Classification Search
CPC ......... G06T 13/40; G06T 7/246; G06T 15/20; G06T 19/006; G06T 2207/30196; H04N 23/695
See application file for complete search history.

(56) References Cited

U.S. PATENT DOCUMENTS 7,848,564 B2 * 12/2010 Sullivan .................. G06T 7/285
348/169
2016/0026253 A1 * 1/2016 Bradski ................ H04N 13/128
345/8
(Continued)

FOREIGN PATENT DOCUMENTS

CN 106251282 A 12/2016
CN 107274464 A 10/2017
(Continued)

OTHER PUBLICATIONS

Jul. 20, 2023—(WO) Search Report—App PCT/CN2023/088575.

*Primary Examiner* — Terrell M Robinson
(74) *Attorney, Agent, or Firm* — Banner & Witcoff, Ltd.

(57) ABSTRACT

This application provides a method and an apparatus for rendering an interaction picture, a device, a computer-readable storage medium, and a computer program product. The method includes: obtaining interaction data of at least two real characters performing interaction with each other in a target scene and motion-capture data of a first character in the at least two real characters, where the motion-capture data is configured for driving a virtual character corresponding to the first character to perform an interactive action consistent with that of the first character; and performing picture rendering based on the interaction data and the motion-capture data, to obtain a picture in which the virtual character performs interaction with a second character in the (Continued)

target scene, where the second character is a character other than the first character in the at least two real characters.

17 Claims, 8 Drawing Sheets

(51) Int. Cl.
*G06T 15/20* (2011.01)
*G06T 19/00* (2011.01)
*H04N 23/695* (2023.01)

(52) U.S. Cl.
CPC . *H04N 23/695* (2023.01); *G06T 2207/30196* (2013.01)

(56) References Cited

U.S. PATENT DOCUMENTS

| | | | |
|---|---|---|---|
| 2016/0035079 A1* | 2/2016 | Tenney | ...................... G06T 7/80 |
| | | | 382/153 |
| 2018/0336724 A1 | 11/2018 | Spring et al. | |
| 2018/0361989 A1* | 12/2018 | Zhou | ..................... B60R 25/305 |
| 2020/0294297 A1* | 9/2020 | Chaney | ................ H04N 9/3194 |
| 2022/0083130 A1* | 3/2022 | Ross | ........................ G06F 3/011 |
| 2023/0017325 A1* | 1/2023 | Nilsson | ................... G06T 7/194 |
| 2023/0326092 A1* | 10/2023 | McTernan | .............. G06F 3/011 |
| | | | 345/619 |

FOREIGN PATENT DOCUMENTS

| | | | | |
|---|---|---|---|---|
| CN | 107274466 A | * | 10/2017 | ............. G06T 7/251 |
| CN | 110290291 A | | 9/2019 | |

* cited by examiner

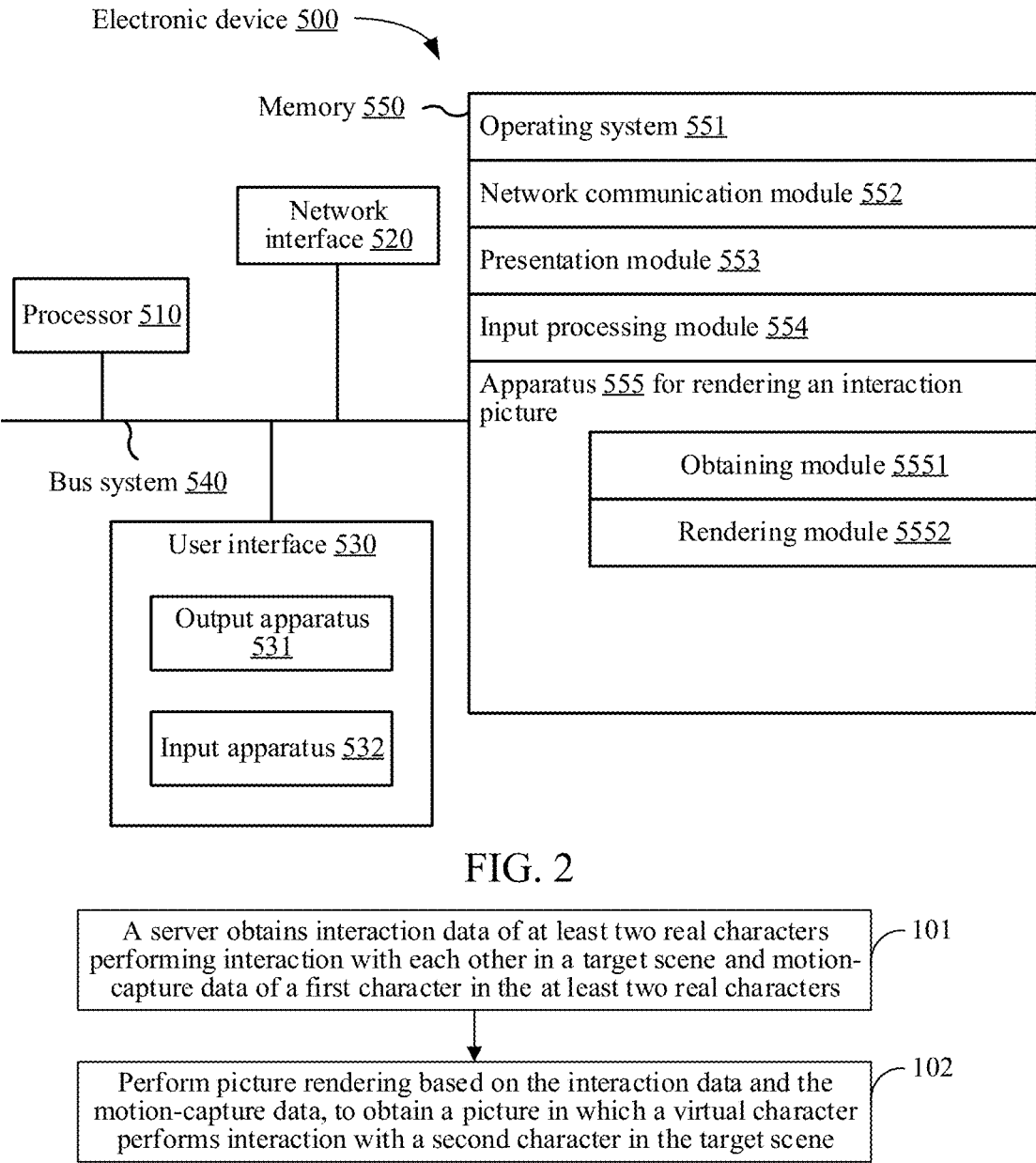

FIG. 2

A server obtains interaction data of at least two real characters performing interaction with each other in a target scene and motion-capture data of a first character in the at least two real characters
— 101

Perform picture rendering based on the interaction data and the motion-capture data, to obtain a picture in which a virtual character performs interaction with a second character in the target scene
— 102

FIG. 3

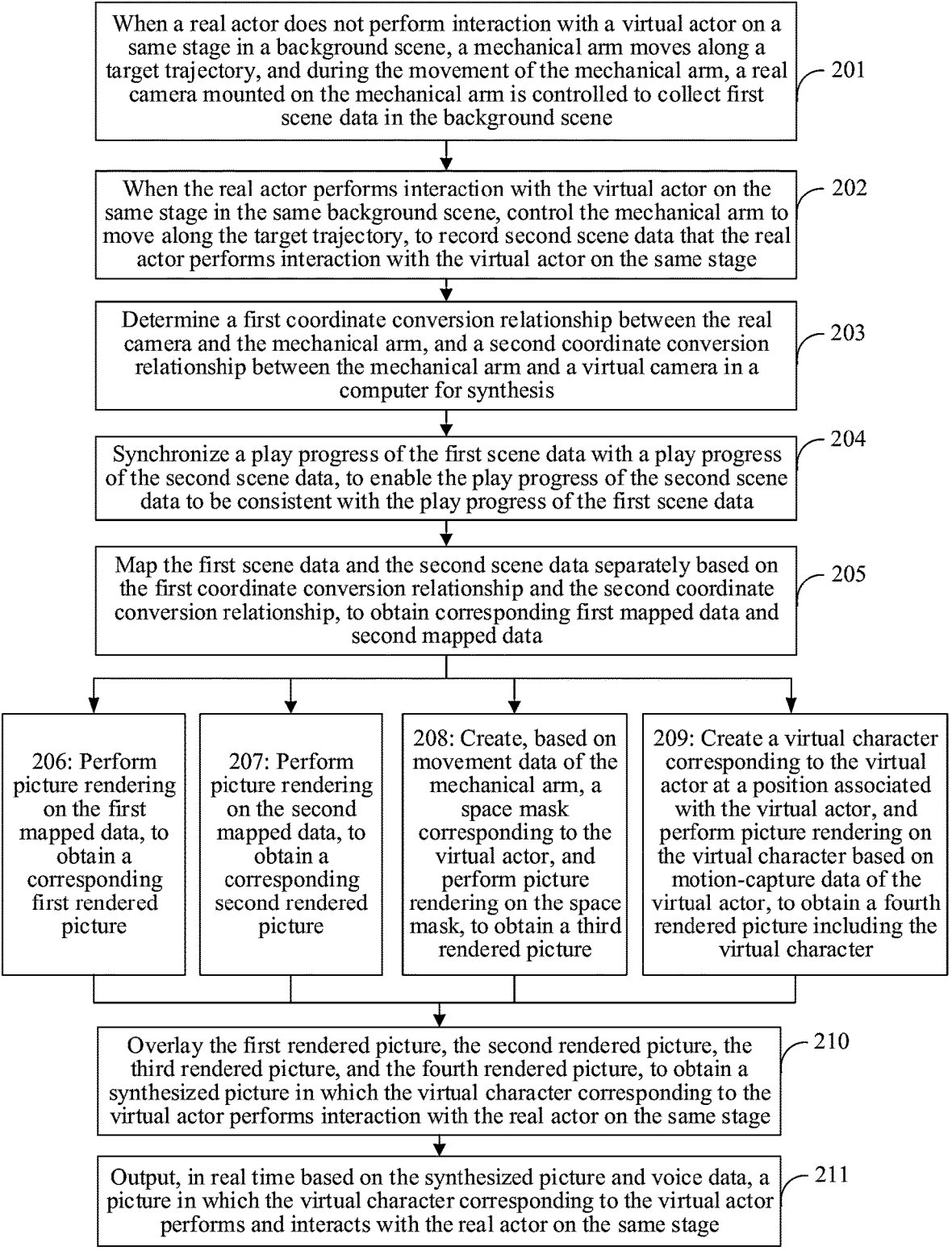

When a real actor does not perform interaction with a virtual actor on a same stage in a background scene, a mechanical arm moves along a target trajectory, and during the movement of the mechanical arm, a real camera mounted on the mechanical arm is controlled to collect first scene data in the background scene ⌐ 201

When the real actor performs interaction with the virtual actor on the same stage in the same background scene, control the mechanical arm to move along the target trajectory, to record second scene data that the real actor performs interaction with the virtual actor on the same stage ⌐ 202

Determine a first coordinate conversion relationship between the real camera and the mechanical arm, and a second coordinate conversion relationship between the mechanical arm and a virtual camera in a computer for synthesis ⌐ 203

Synchronize a play progress of the first scene data with a play progress of the second scene data, to enable the play progress of the second scene data to be consistent with the play progress of the first scene data ⌐ 204

Map the first scene data and the second scene data separately based on the first coordinate conversion relationship and the second coordinate conversion relationship, to obtain corresponding first mapped data and second mapped data ⌐ 205

206: Perform picture rendering on the first mapped data, to obtain a corresponding first rendered picture 207: Perform picture rendering on the second mapped data, to obtain a corresponding second rendered picture 208: Create, based on movement data of the mechanical arm, a space mask corresponding to the virtual actor, and perform picture rendering on the space mask, to obtain a third rendered picture 209: Create a virtual character corresponding to the virtual actor at a position associated with the virtual actor, and perform picture rendering on the virtual character based on motion-capture data of the virtual actor, to obtain a fourth rendered picture including the virtual character Overlay the first rendered picture, the second rendered picture, the third rendered picture, and the fourth rendered picture, to obtain a synthesized picture in which the virtual character corresponding to the virtual actor performs interaction with the real actor on the same stage ⌐ 210

Output, in real time based on the synthesized picture and voice data, a picture in which the virtual character corresponding to the virtual actor performs and interacts with the real actor on the same stage ⌐ 211

FIG. 5A

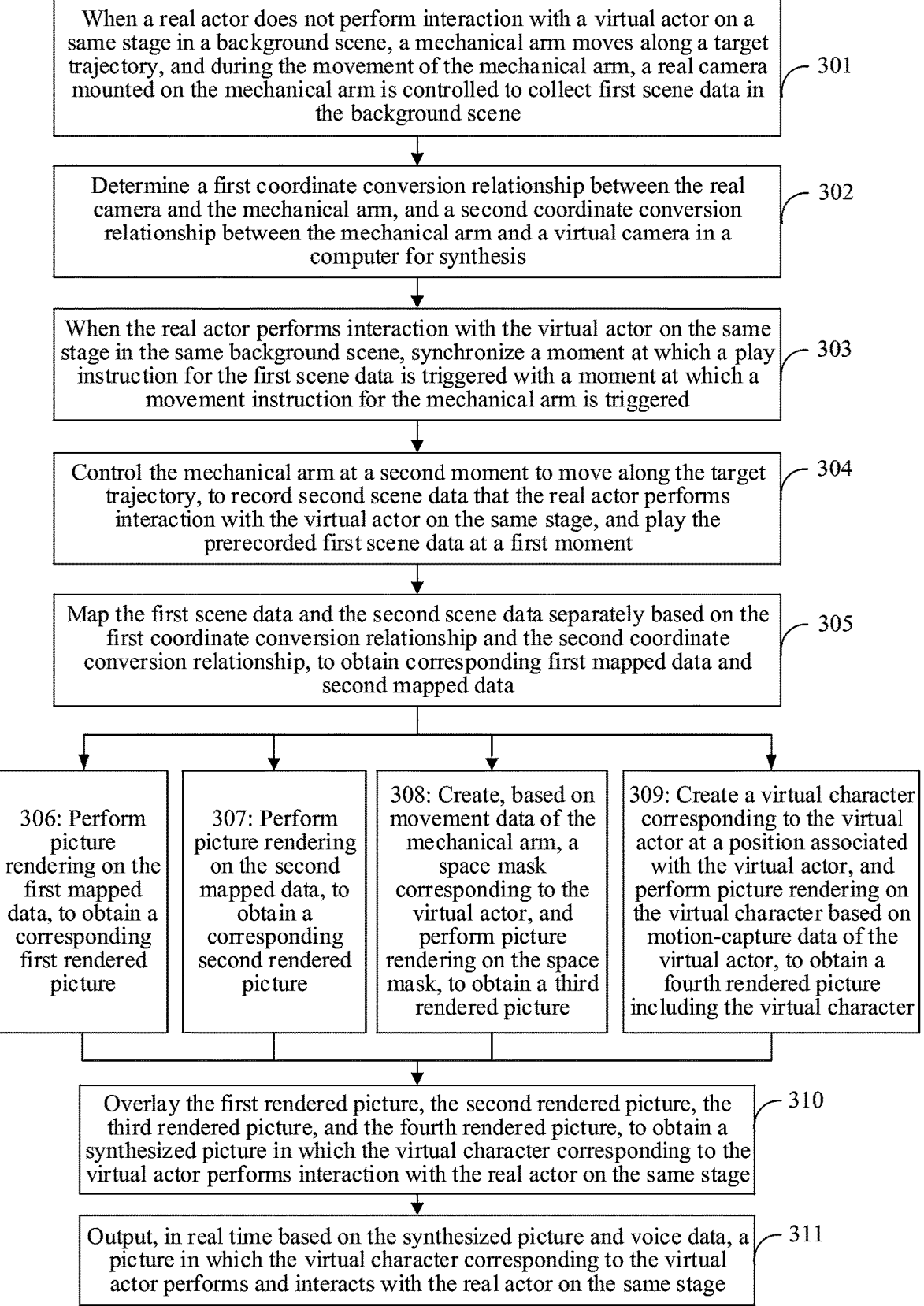

When a real actor does not perform interaction with a virtual actor on a same stage in a background scene, a mechanical arm moves along a target trajectory, and during the movement of the mechanical arm, a real camera mounted on the mechanical arm is controlled to collect first scene data in the background scene ⟋ 301

Determine a first coordinate conversion relationship between the real camera and the mechanical arm, and a second coordinate conversion relationship between the mechanical arm and a virtual camera in a computer for synthesis ⟋ 302

When the real actor performs interaction with the virtual actor on the same stage in the same background scene, synchronize a moment at which a play instruction for the first scene data is triggered with a moment at which a movement instruction for the mechanical arm is triggered ⟋ 303

Control the mechanical arm at a second moment to move along the target trajectory, to record second scene data that the real actor performs interaction with the virtual actor on the same stage, and play the prerecorded first scene data at a first moment ⟋ 304

Map the first scene data and the second scene data separately based on the first coordinate conversion relationship and the second coordinate conversion relationship, to obtain corresponding first mapped data and second mapped data ⟋ 305

306: Perform picture rendering on the first mapped data, to obtain a corresponding first rendered picture 307: Perform picture rendering on the second mapped data, to obtain a corresponding second rendered picture 308: Create, based on movement data of the mechanical arm, a space mask corresponding to the virtual actor, and perform picture rendering on the space mask, to obtain a third rendered picture 309: Create a virtual character corresponding to the virtual actor at a position associated with the virtual actor, and perform picture rendering on the virtual character based on motion-capture data of the virtual actor, to obtain a fourth rendered picture including the virtual character Overlay the first rendered picture, the second rendered picture, the third rendered picture, and the fourth rendered picture, to obtain a synthesized picture in which the virtual character corresponding to the virtual actor performs interaction with the real actor on the same stage ⟋ 310

Output, in real time based on the synthesized picture and voice data, a picture in which the virtual character corresponding to the virtual actor performs and interacts with the real actor on the same stage ⟋ 311

FIG. 5B

Empty-environment picture                    Shoot

Real actor                Virtual actor

Virtual character

Real actor          Virtual character

METHOD AND APPARATUS FOR RENDERING INTERACTION PICTURE, DEVICE, STORAGE MEDIUM, AND PROGRAM PRODUCT

RELATED APPLICATION

This application is a continuation application of PCT Application PCT/CN2023/088575, filed Apr. 17, 2023, which claims priority to Chinese Patent Application No. 202210637623.4 filed on Jun. 7, 2022, each entitled "METHOD AND APPARATUS FOR RENDERING INTERACTION PICTURE, DEVICE, STORAGE MEDIUM, AND PROGRAM PRODUCT", and each which is incorporated herein by reference in its entirety.

FIELD OF THE TECHNOLOGY

This application relates to the field of computer technologies, and in particular, to a method and an apparatus for rendering an interaction picture, a device, a computer-readable storage medium, and a computer program product.

BACKGROUND

With the development of computer technologies and network technologies, live streaming performed by a virtual character occupies an increasing proportion in live streaming services. The live streaming performed by the virtual character is typically live streaming performed by a specific virtual character instead of a real image of a real person (that is, e.g., a virtual actor). In a related art, in a case that a real character (a real actor or person) interacts and performs with a virtual actor on a same stage, usually, the real character performs on the stage, and motion-capture data of the virtual actor is captured in a motion capture studio. Then, a virtual character is generated by using a computer based on the motion-capture data of the virtual actor (e.g., to replicate the movements and actions of the virtual actor), and the virtual character is synthesized on the real stage in real-time, to present a picture in which the real character and the virtual character perform on the same stage.

However, in the foregoing manner, the real character and the virtual actor are not in a same space during shooting (e.g., motion capture), and perform independently of each other. In the picture synthesized based on the real character and the virtual actor, realness or authenticity of interaction between the real character and the virtual character may be poor, resulting in a poor visual experience for a person.

SUMMARY

Aspects described herein provide a method and an apparatus for rendering an interaction picture, a device, a computer-readable storage medium, and a computer program product, to improve realness and naturalness of interaction between a real character and a virtual character in a picture obtained through rendering.

One or more aspects provides a method for rendering an interaction picture. The method includes: obtaining interaction data of at least two real characters performing interaction with each other in a target scene and motion-capture data of a first character in the at least two real characters, the motion-capture data being configured for driving a virtual character corresponding to the first character to perform an interactive action consistent with that of the first character; and performing picture rendering based on the interaction data and the motion-capture data, to obtain a picture in which the virtual character performs interaction with a second character in the target scene, the second character being a character other than the first character in the at least two real characters.

One or more other aspects provides an apparatus for rendering an interaction picture. The apparatus includes: an obtaining module, configured to obtain interaction data of at least two real characters performing interaction with each other in a target scene and motion-capture data of a first character in the at least two real characters, the motion-capture data being configured for driving a virtual character corresponding to the first character to perform an interactive action consistent with that of the first character; and a rendering module, configured to perform picture rendering based on the interaction data and the motion-capture data, to obtain a picture in which the virtual character performs interaction with a second character in the target scene, the second character being a character other than the first character in the at least two real characters.

Further aspects provide an electronic device. The electronic device includes: a memory, configured to have executable instructions stored therein; and a processor, configured to implement, when executing the executable instructions stored in the memory, the method for rendering an interaction picture.

Still further, one or more aspects relate to a computer-readable storage medium, having executable instructions stored therein, the executable instructions, when being executed by a processor, implementing the method for rendering an interaction picture.

Yet other aspects provide a computer program product, including a computer program or instructions, the computer program or instructions, when being executed by a processor, implementing the method for rendering an interaction picture.

The aspects described herein have the following beneficial effects:

Picture rendering may be performed by using the interaction data of the at least two real characters performing interaction with each other in the target scene and the motion-capture data of the first character. Consequently, the motion-capture data can drive the rendering of the virtual character corresponding to the first character to perform the interactive action consistent with that of the first character. Therefore, when the picture rendering is performed based on the interaction data and the motion-capture data, in the obtained picture, the virtual character performs a motion completely consistent with that of the first character, so that interaction between the real characters in the target scene is redisplayed, thereby improving realness, authenticity, and naturalness of the interaction between the real character and the virtual character in the picture obtained through rendering, and improving visual experience for a user.

BRIEF DESCRIPTION OF THE DRAWINGS

FIG. 2 is a schematic diagram of a structure of an example electronic device according to one or more aspects described herein.

FIG. 3 is a schematic flowchart of an example method for rendering an interaction picture according to one or more aspects described herein.

FIG. 5A is a schematic flowchart of an example method for rendering an interaction picture according to one or more aspects described herein.

FIG. 5B is a schematic flowchart of an example method for rendering an interaction picture according to one or more aspects described herein.

DETAILED DESCRIPTION

To make the objectives, technical solutions, and advantages of this disclosure clearer, the following includes detailed description with reference to the accompanying drawings. The described aspects are not to be considered as a limitation to the invention. Other aspects that may be obtained by a person of ordinary skill in the art without creative efforts shall fall within the scope of protection.

In the following descriptions, the various aspects may be combined with each other without conflict.

In the following descriptions, the involved terms "first/second . . . " are merely intended to distinguish similar objects, but do not indicate a specific order of an object. The "first/second . . . " are interchangeable in terms of a specific order or sequence if permitted, so that aspects described herein can be implemented in other orders than the order illustrated or described herein.

Unless otherwise defined, meanings of all technical and scientific terms used in this specification are the same as meanings generally understood by a person skilled in the technical field to which this application belongs. Terms used in this specification are merely intended to describe objectives, but are not intended to be limiting.

Figure 1:
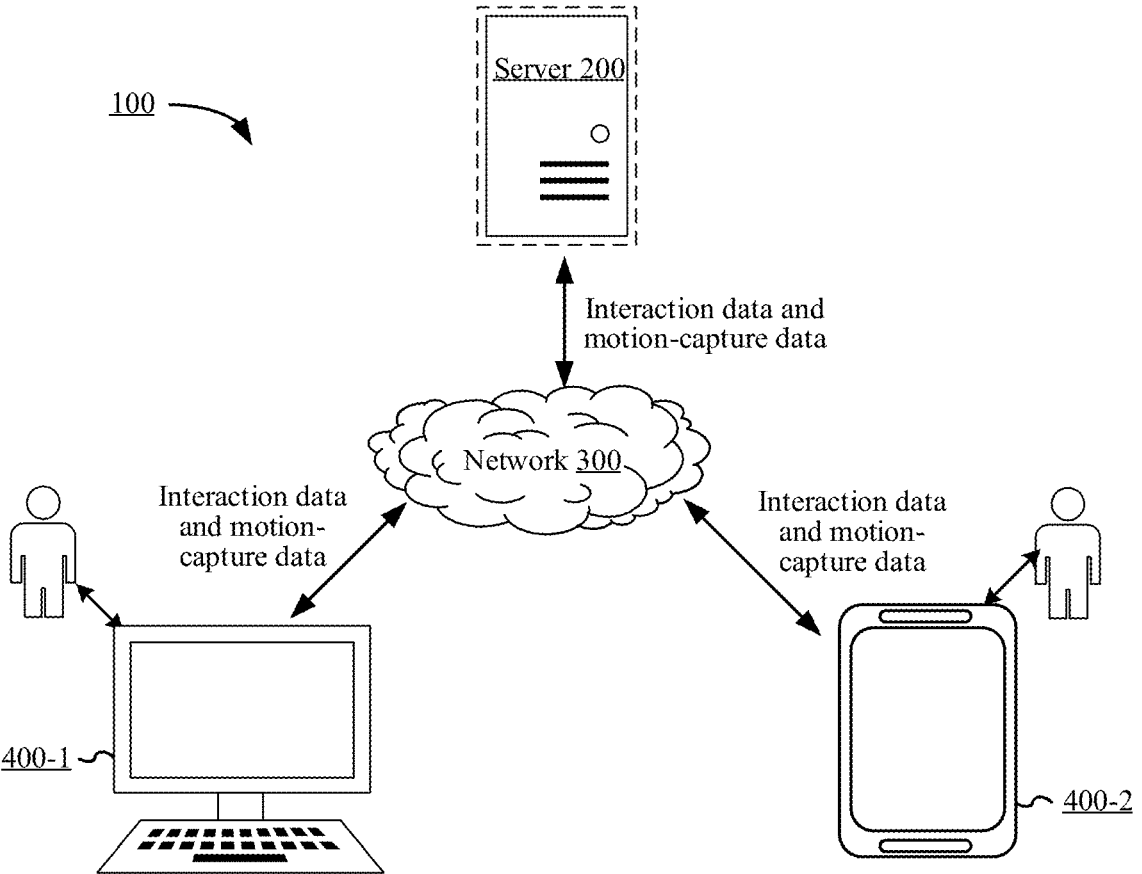
FIG. 1 is a schematic diagram of an example architecture of a system for rendering an interaction picture according to one or more aspects described herein.

FIG. 1 is a schematic diagram of an example architecture of a system 100 for rendering an interaction picture. To support an example application, a terminal (a terminal 400-1 and a terminal 400-2 are exemplarily shown) is connected to a server 200 through a network 300. The network 300 may be a wide area network or a local area network, or a combination thereof. Data transmission is implemented through a radio link.

The terminal may be a device having a data collection (for example, video collection) function, such as an augmented reality (AR) device, a virtual reality (VR) device, or a mixed reality (MR) device. In another example, the AR device may include various types of user terminals having an AR function such as a smartphone, a tablet computer, a notebook computer, or AR glasses, or may be a desktop computer or a television having an AR function, or a combination of any two or more of these data processing devices. The server 200 may be a separately configured server supporting various services, a server cluster, a cloud server, or the like.

During actual application or use, after a user collects, by using a data collection device in the terminal, interaction data of at least two real characters or people performing interaction with each other on a same stage in a target scene and motion-capture data of a first character of the at least two real characters. The interaction data and the motion-capture data may be transmitted to the server once collected or otherwise obtained. The server performs picture rendering based on the interaction data and the motion-capture data, to obtain a picture or image in which a virtual character (representing the first character) performs interaction with a second character on the same stage in the target scene and displays the picture or image. The second character is a character other than the first character of the at least two real characters. The picture rendering is performed by using the interaction data of the at least two real characters performing interaction with each other in the target scene and the motion-capture data of the first character, and the motion-capture data can drive the virtual character corresponding to the first character to perform an interactive action consistent with that of the first character. Therefore, when the picture rendering is performed based on the interaction data and the motion-capture data, in the obtained picture or image, the virtual character performs a motion completely consistent (e.g., accurate) with respect to the actions and motions of the first character, so that interaction between the real characters in the target scene is rendered and redisplayed, thereby improving realness and naturalness of interaction between the real character and the virtual character in the picture obtained through rendering, and improving visual experience for the user.

FIG. 2 is a schematic diagram of a structure of an example electronic device 500. In one example, the electronic device 500 may be the terminal or the server 200 in FIG. 1. An example in which the electronic device is the terminal shown in FIG. 1 is used to describe the electronic device that implements an example method for rendering an interaction picture. The electronic device 500 shown in FIG. 2 may include at least one processor 510, a memory 550, at least one network interface 520, and a user interface 530. All the components in the electronic device 500 may be coupled together by using a bus system 540. The bus system 540 may be configured to implement connection and communication between the components. In addition to a data bus, the bus system 540 may further include a power bus, a control bus, and a state signal bus. However, for illustrative purposes, all types of buses are marked as the bus system 540 in FIG. 2.

The processor 510 may be an integrated circuit chip having a signal processing capability. For example, the processor 510 may be a general purpose processor, a digital signal processor (DSP), or another programmable logic device, discrete gate, transistor logical device, or discrete hardware component. The general purpose processor may be a microprocessor, any conventional processor, or the like.

The user interface 530 may include one or more output apparatuses 531 that can display media content, including one or more speakers and/or one or more visual display screens. The user interface 530 may further include one or more input apparatuses 532, including a user interface component that facilitate inputting for a user, such as a keyboard, a mouse, a microphone, a touch display screen, a camera, and other input buttons and controls.

The memory 550 may be a removable memory, a non-removable memory, or a combination thereof. For example, a hardware device may include a solid-state memory, a hard disk driver, an optical disc driver, or the like. In some examples, the memory 550 may include one or more storage devices away from the processor 510 in a physical position. The memory 550 may include a volatile memory or a non-volatile memory, or may include both the volatile memory and the non-volatile memory. The non-volatile memory may be a read-only memory (ROM). The volatile memory may be a random access memory (RAM). The memory 550 described herein may include any other suit-able types of memories. In some arrangements, the memory 550 may store data to support various operations. Examples of the data include a program, a module, and a data structure, or a subset or a superset thereof, which are described below by using examples.

An operating system 551 may include a system program configured to process various basic system services and perform a hardware-related task, such as a framework layer, a core library layer, or a driver layer, and may be configured to implement various basic services and process a hardware-based task.

A network communication module 552 may be config-ured to reach (e.g., communicate to, send and receive data to and from) another computing device through one or more (wired or wireless) network interfaces 520. For example, the network interface 520 may include: Bluetooth, wireless fidelity (Wi-Fi), a universal serial bus (USB), and the like.

A presentation module 553 may be configured to display information by using one or more output apparatus 531 (for example, a display screen or a speaker) associated with the user interface 530 (for example, a user interface configured to operate a peripheral device and display content and information).

An input processing module 554 may be configured to detect one or more user inputs or interactions from one of the one or more input apparatuses 532 and translate the detected input or interaction.

In some arrangements, an apparatus for rendering an interaction picture may be implemented in the form of software. FIG. 2 shows an example apparatus 555 for rendering an interaction picture stored in the memory 550, which may be software in a form of a program, a plug-in, or the like, including the following software modules: an obtaining module 5551 and a rendering module 5552. The modules may be logical and therefore may be combined or further divided in any way based on a to-be-implemented function. The following describes functions of each module. In some other arrangements, an apparatus for rendering an interaction picture may be implemented in a form of hard-ware. For example, the apparatus for rendering an interac-tion picture may be a processor in a form of a hardware decoding processor, programmed to perform the method for rendering an interaction picture. For example, the processor in the form of a hardware decoding processor may use one or more application-specific integrated circuit (ASIC), a DSP, a programmable logic device (PLD), a complex pro-grammable logic device (CPLD), a field-programmable gate array (FPGA), or other electronic components.

In some examples, the terminal or the server may imple-ment the method for rendering an interaction picture by running a computer program. For example, the computer program may be a native program or a software module in an operating system; may be a native application (APP), that is, a program that needs to be installed in the operating system to run, such as a live streaming APP or an instant messaging APP; may be an applet, that is, a program that only needs to be downloaded into a browser environment to run; or may be an applet that can be embedded into any APP. The computer program may be any form of an application, a module, or a plug-in.

Based on the foregoing description of a system for rendering an interaction picture, the following describes an example method for rendering an interaction picture. In one or more arrangements, the method may be implemented by the terminal or the server 200 shown in FIG. 1 individually, or may be implemented by the terminal and the server 200 shown in FIG. 1, collaboratively. FIG. 1 and FIG. 3 are referenced below. FIG. 3 is a schematic flowchart of an example method for rendering an interaction picture. An example in which the server shown in FIG. 1 individually implements a method for rendering an interaction picture is used for description.

Operation 101: A server obtains interaction data of at least two real characters performing interaction with each other in a target scene and motion-capture data of a first character in the at least two real characters.

In one or more arrangements, a terminal may be a device having a data collection (for example, video collection) function. After the interaction data of the at least two real characters performing interaction with each other on a same stage in the target scene and the motion-capture data of the first character are collected by a data collection device in the terminal, the interaction data and the motion-capture data may be transmitted to the server for picture rendering.

The real characters may be real (e.g., live, physical) interactive objects performing interaction with each other on the same stage (that is, performing interaction with each other in a same scene such as the target scene). For example, the real characters may be real people or real animals performing interaction with each other on the same stage (for example, performing live streaming or performing on the same stage). The interaction data may be related data of the interaction between the real characters, and may include, for example, related data such as a voice, a motion, and an expression in an interaction process. The motion-capture data may correspond to the first character, and include, but is not limited to, voice data, motion data, and expression data that are of the first character. The motion-capture data may be configured for driving a virtual character corre-sponding to the first character to perform an interactive action consistent with that of the first character.

Operation 102: Perform picture rendering based on the interaction data and the motion-capture data, to obtain a picture in which the virtual character performs interaction with a second character in the target scene.

The second character may be a character other than the first character of the at least two real characters. After receiving the interaction data of the at least two real char-acters and the motion-capture data of the first character, the server may perform the picture rendering based on the interaction data and the motion-capture data. In a rendering process, the first character may be replaced with the virtual character corresponding to the first character, to obtain a picture in which the virtual character performs interaction with another real character on the same stage. The virtual character may include a virtual person image, a virtual animal image, a virtual cartoon image, a virtual object, and the like. A display style of the virtual character is not limited.

In one example, a quantity of real characters collected by the data collection device in the terminal may be two. When a real character 1 performs interaction with a real character 2 on a same stage (that is, the target scene), the data collection device in the terminal may record an interaction process between the real character 1 and the real character 2 to obtain corresponding interaction data. The data collec-tion device may capture related data such as a motion, a voice, and an expression of the real character 2 to obtain motion-capture data of the real character 2, and transmit the obtained interaction data and motion-capture data to the server. The server may perform picture rendering based on the interaction data and the motion-capture data, to obtain a picture in which the real character 1 performs interaction with a virtual character corresponding to the real character 2 on the same stage. In other words, during rendering, the real character 2 may be replaced with the virtual character that performs a motion completely consistent with (e.g., representative of, corresponding to) that of the real character 2, so that interaction between the real characters on the same stage may be converted into interaction between the virtual character and the real character on the same stage.

In some examples, the server may perform the picture rendering based on the interaction data and the motion-capture data in the following manner, to obtain the picture in which the virtual character performs interaction with the second character in the target scene: performing the picture rendering based on the interaction data, to obtain a first interaction picture in which the at least two real characters perform interaction with each other on the same stage; creating a space mask corresponding to the first character, and rendering the space mask into the first interaction picture, to replace the first character with the space mask (that is, masking the first character in the first interaction picture based on the space mask), so as to obtain a second interaction picture in which the second character performs interaction with the space mask; and creating the virtual character corresponding to the first character at a position of the space mask, and rendering the virtual character into the second interaction picture based on the motion-capture data, to obtain the picture in which the virtual character performs interaction with the second character in the target scene.

A process of performing picture rendering on the interaction data to obtain an interactive animation may be a process of rendering every frame of the recorded interaction data to obtain frames of images, and then synthesizing the frames of images to form the interactive animation. For example, one frame of image may be obtained through rendering. To better represent three-dimensional images of the first character and the virtual character (corresponding to the first character), a three-dimensional image mask may be used as the space mask, to cover a layer (or a black and white channel of the layer) at which the first character is located, and cover and replace the first character. When the space mask is disposed above the first character, the space mask may be a mask layer, the first character may be a masked layer, and an overlapping region between the mask layer and the masked layer may be covered. That is, an object at a corresponding position covered by the mask layer in the masked layer may be invisible.

After receiving the interaction data and the motion-capture data, the server may perform the picture rendering on the interaction data, to obtain the first interaction picture in which the at least two real characters perform interaction with each other on the same stage, create the space mask corresponding to the first character, and render the space mask into the first interaction picture, to replace the first character with the space mask (that is, masking the first character in the first interaction picture based on the space mask), in other words, the second interaction picture in which the first character covered by the space mask performs interaction with another uncovered real character may be obtained. In one or more arrangements, to make the rendered picture more natural or authentic, a pixel value of rendering performed by a mask rendering layer may be adjusted. In some arrangements, the pixel value of the rendering performed by the mask rendering layer may be adjusted to a preset target pixel value. For example, a lower set pixel value indicates a more significant feathering effect and more natural fusion. Then, the motion-capture data of the first character may be connected to the virtual character corresponding to the first character, to drive the virtual character to perform a motion consistent with that of the first character, so as to obtain an animation in which the virtual character performs interaction with the another uncovered real character.

In some examples, the server may obtain the motion-capture data of the first character in the at least two real characters in the following manner: obtaining, when the first character in the at least two real characters wears a motion capture device, position change data that is of a marked point on the motion capture device and that is captured by a real camera, and using the position change data as motion data of the first character, where the marked point corresponds to a skeletal key point of the first character; obtaining, when the first character is mounted with an expression capture device, expression data that is of the first character and that is captured by the expression capture device; obtaining, when the first character is mounted with a voice collection device, voice data that is of the first character and that is collected by the voice collection device; and determining at least one of the motion data, the expression data, and the voice data that are of the first character as the motion-capture data.

In some examples, the motion capture device may include clothes worn on the first character, a glove worn on a hand of the first character, and the like. The clothes may be configured to capture a body action of the first character, and the glove may be configured to capture a hand action of the first character. The motion capture device may include a plurality of marked points, and each marked point may correspond to a skeletal key point of the first character. For example, the marked point may be set at a position of the motion capture device corresponding to each joint (for example, a knee joint, an elbow joint, or a finger joint) of the skeleton of the first character. The marked point may be made of a specific material (for example, a nanomaterial). Position change data of a feature point may be obtained by using a camera, and the position change data is used as the motion data of the first character. To drive the virtual character corresponding to the first character, the virtual character may include controlled points matching the plurality of marked points. For example, a marked point of an elbow joint of the first character may match a controlled point of an elbow joint of the virtual character, that is, the skeletal key points of the first character may be in one-to-one correspondence with skeletal key points of the virtual character. In this way, after position change data of the marked point of the elbow joint of the first character is obtained, the elbow joint of the virtual character may be driven to change correspondingly, so that a change of a motion of the virtual character may be formed based on changes of the plurality of controlled points.

Similarly, when the first character is mounted with the expression capture device, after capturing the expression data of the first character, the expression capture device may transmit the expression data of the first character to the server. The server may drive (e.g., generate), based on the expression data of the first character, the virtual character corresponding to the first character to make an expression action consistent with that of the first character. When the first character is mounted with the voice collection device, after collecting the voice data of the first character, the voice collection device may transmit the voice data of the first character to the server. The server may drive (e.g., generate), based on the voice data of the first character, the virtual character corresponding to the first character to make a voice consistent with that of the first character.

In one or more arrangements, the motion capture device, the expression capture device, and the voice collection device may be integrated into one device. For example, the motion capture device may include a camera, and the camera is configured to capture the expression data of the first character. The motion capture device may further include a voice capture device (for example, a microphone) to collect the voice data of the first character.

In some arrangements, the server may obtain, in the following manner, the interaction data of the at least two real characters performing interaction with each other in the target scene: obtaining original data that is recorded by the real camera and that is of the at least two real characters performing interaction with each other in the target scene, where the real camera is mounted on a mechanical arm, and the mechanical arm is connected to the real camera through an end actuator of the mechanical arm; determining a first coordinate conversion relationship between the real camera and the mechanical arm, and a second coordinate conversion relationship between the mechanical arm and a virtual camera configured for performing the picture rendering; and mapping the original data based on the first coordinate conversion relationship and the second coordinate conversion relationship, to obtain mapped data of the original data in the virtual camera, and using the mapped data as the obtained interaction data of the at least two real characters performing interaction with each other on the same stage.

The interaction process of the at least two real characters performing interaction with each other on the same stage may be recorded by the real camera mounted on the mechanical arm. The real camera may be connected to the mechanical arm through the end actuator of the mechanical arm. To replicate a picture shot by the real camera in the virtual camera configured for performing the picture rendering, the original data recorded by the real camera might need to be mapped, to obtain the mapped data of the original data in the virtual camera. The mapped data may be used as the interaction data of the at least two real characters performing interaction with each other on the same stage, to perform the picture rendering based on the interaction data.

When the original data that is recorded by the real camera of the at least two real characters performing interaction with each other on the same stage is mapped, the first coordinate conversion relationship between the real camera and the mechanical arm might need to be obtained, to first map the original data to a coordinate system of the mechanical arm based on the first coordinate conversion relationship, so as to obtain intermediate mapped data. Then, the second coordinate conversion relationship between the mechanical arm and the virtual camera may be obtained, to map the intermediate mapped data to a coordinate system of the virtual camera based on the second coordinate conversion relationship, so as to obtain the final mapped data. The obtained final mapped data may be used as the interaction data that is obtained by the server of the at least two real characters performing interaction with each other on the same stage.

In some examples, the server may determine the first coordinate conversion relationship between the real camera and the mechanical arm in the following manner: obtaining a third coordinate conversion relationship between the real camera and the end actuator of the mechanical arm, and a fourth coordinate conversion relationship between the end actuator of the mechanical arm and a base coordinate system of the mechanical arm; and determining the first coordinate conversion relationship between the real camera and the mechanical arm based on the third coordinate conversion relationship and the fourth coordinate conversion relationship.

To mark the first coordinate conversion relationship between the real camera and the mechanical arm, the third coordinate conversion relationship between the real camera and the end actuator of the mechanical arm and the fourth coordinate conversion relationship between the end actuator of the mechanical arm and the base coordinate system of the mechanical arm might need to be first obtained. The first coordinate conversion relationship between the real camera and the mechanical arm may be obtained based on the third coordinate conversion relationship and the fourth coordinate conversion relationship, for example, by multiplying the third coordinate conversion relationship by the fourth coordinate conversion relationship.

In some arrangements, when the original data includes background data, the server may obtain, in the following manner, the original data that is recorded by the real camera of the at least two real characters performing interaction with each other in the target scene:

obtaining first scene data of the target scene, where the first scene data is scene data that is recorded by the real camera during movement of the mechanical arm along a target trajectory and that does not include the at least two real characters; obtaining second scene data of the target scene, where the second scene data is scene data that is recorded by the real camera during the movement of the mechanical arm along the target trajectory when the at least two real characters perform interaction with each other in the target scene and that includes the at least two real characters; and determining the first scene data and the second scene data as the original data.

In some examples, before the at least two real characters perform interaction with each other on the same stage, in other words, when the target scene does not include the at least two real characters, the mechanical arm is controlled to move along the target trajectory, and during the movement of the mechanical arm, the real camera mounted on the mechanical arm is controlled to record the first scene data that does not include the at least two real characters. When the at least two real characters perform interaction with each other on the same stage, the mechanical arm is controlled to move along the target trajectory, and during the movement of the mechanical arm, the real camera is controlled to record the second scene data that includes the at least two real characters performing interaction with each other on the same stage. The first scene data and the second scene data are determined as the original data of the at least two real characters performing interaction with each other on the same stage.

Because the first scene data in such examples does not include the real character, the first scene data may be considered as the background data. The second scene data, on the other hand, includes both the background data and data of the interaction between the real characters. Before all (the at least two) real characters perform interaction with each other on the same stage in a background scene, the background scene (that is, the target scene that does not include the real character) may be recorded first by the mechanical arm mounted with the real camera. For example, the mechanical arm may be controlled to move along a preset target trajectory, to drive the real camera mounted on the mechanical arm to move along the target trajectory with the mechanical arm, and the background scene may be recorded during the movement to obtain the first scene data. In this case, because the target scene does not include real characters, the first scene data does not include related data of the interaction between the real characters. After the first scene data is obtained, when all the real characters begin performing interaction with each other on the same stage in the same background scene, the mechanical arm may be controlled to move along the original target trajectory, to record the second scene data where all the real characters perform interaction with each other on the same stage. The second scene data may include the original background data. After the second scene data is recorded by the mechanical arm, the first scene data and the second scene data may be used as the original data of all the real characters performing interaction with each other on the same stage.

In some examples, the server may control, in the following manner, the mechanical arm to move along the target trajectory: receiving a movement instruction for the mechanical arm, where the movement instruction is configured for instructing the mechanical arm to move along the target trajectory; controlling, in response to the received movement instruction for the mechanical arm, the mechanical arm to move along the target trajectory; and controlling the real camera to record the first scene data during the movement of the mechanical arm.

Correspondingly, the server may determine, in the following manner, the first scene data and the second scene data as the original data of the at least two real characters performing interaction with each other on the same stage: obtaining a receiving moment of the movement instruction and target duration required for transmitting the second scene data from the real camera to the virtual camera; and starting a timer at the receiving moment, triggering a play instruction for the first scene data and playing the first scene data based on the play instruction when the timer duration reaches the target duration, and determining the played first scene data and the recorded second scene data as the original data of the at least two real characters performing interaction with each other on the same stage.

A movement trajectory (for example, the target trajectory) of the mechanical arm may be set based on content that needs to be shot (e.g., captured by camera). During the movement of the mechanical arm along the target trajectory, the real camera is driven to shoot or capture the first scene data (that is, a background picture or an empty-environment picture) of the background scene in advance along the target trajectory. In this case, the first scene data does not include the related data of the interaction between the at least two real characters, and the first scene data is cached in an internal memory. When the at least two real characters perform interaction with each other on the same stage in the same background scene, a moment at which the play instruction for the first scene data is triggered and a moment at which the movement instruction for the mechanical arm is triggered are synchronized, to enable a play progress of the first scene data to be consistent with a play progress of the second scene data in the virtual camera. The play instruction is configured for triggering playing of the pre-shot first scene data (that is, the empty-environment picture), and the movement instruction is configured for triggering the mechanical arm to move along the target trajectory to shoot the interaction picture including the at least two real characters.

In some cases (for example, where there is no delay in data transmission), when the pre-shot first scene data (e.g., the empty-environment picture) starts to be played, the mechanical arm might need to be simultaneously started to move, to shoot the interaction picture including the at least two real characters and a background picture that is the same as the first scene data (collectively referred to as a person picture). It is assumed that the play instruction is triggered at a first moment (e.g., the pre-shot empty-environment picture starts to be played at the first moment), and the movement instruction is triggered at a second moment (e.g., the mechanical arm is started at the second moment to move along the target trajectory). It may be preferred that the first moment and the second moment correspond to the same moment. However, it may be that a delay in data transmission occurs, and if the movement instruction is triggered while the play instruction is triggered (e.g., the mechanical arm is started to move while the pre-shot empty-environment picture starts to be played), a case in which the played pre-recorded empty-environment picture does not match the background picture in the person picture displayed by the virtual camera may result. For example, target duration (for example, one second) might be needed for transmission, to the virtual camera, interaction data that is shot by the real camera during the movement of the mechanical arm and that includes an interaction picture of a real actor performing interaction with a virtual actor on the same stage. If the mechanical arm is started to move while the pre-shot empty-environment picture starts to be played, the pre-shot empty-environment picture played with same content is earlier (for example, one second earlier) than the picture displayed by the virtual camera. Therefore, to enable the pre-shot empty-environment picture played with the same content to be always consistent with the picture displayed by the virtual camera, the first moment needs to be set to a moment that is later than the second moment by the target duration (for example, one second). In other words, the play instruction is triggered the target duration (for example, one second) after the movement instruction is triggered, and the played first scene data and the recorded second scene data are determined as the original data of the at least two real characters performing interaction with each other on the same stage.

In some arrangements, the server may map the original data based on the first coordinate conversion relationship and the second coordinate conversion relationship in the following manner, to obtain the mapped data of the original data in the virtual camera: mapping the first scene data based on the first coordinate conversion relationship and the second coordinate conversion relationship, to obtain first mapped data of the first scene data in the virtual camera; mapping the second scene data based on the first coordinate conversion relationship and the second coordinate conversion relationship, to obtain second mapped data of the second scene data in the virtual camera; and determining the first mapped data and the second mapped data as the mapped data of the original data in the virtual camera.

When the original data includes the first scene data and the second scene data, the first scene data and the second scene data may be separately mapped based on the first coordinate conversion relationship and the second coordinate conversion relationship. For example, the first scene data may be first mapped to the coordinate system of the mechanical arm based on the first coordinate conversion relationship, to obtain intermediate background mapped data. Then, the intermediate background mapped data may be mapped to the coordinate system of the virtual camera based on the second coordinate conversion relationship, to obtain the first mapped data. Similarly, the second scene data may be first mapped to the coordinate system of the mechanical arm based on the first coordinate conversion relationship, to obtain intermediate original mapped data.

Then, the intermediate original mapped data may be mapped to the coordinate system of the virtual camera based on the second coordinate conversion relationship, to obtain the second mapped data. The first mapped data and the second mapped data may be determined as the mapped data of the original data in the virtual camera.

In some examples, the server may perform the picture rendering based on the interaction data and the motion-capture data in the following manner, to obtain the picture in which the virtual character performs interaction with the second character in the target scene: performing picture rendering based on the first mapped data, to obtain a first rendered picture, and performing picture rendering based on the second mapped data, to obtain a second rendered picture; creating, based on movement data of the mechanical arm, a space mask corresponding to the first character, and performing picture rendering on the space mask, to obtain a third rendered picture; creating, based on the motion-capture data, the virtual character corresponding to the first character at a position associated with the first character, and performing picture rendering on the virtual character, to obtain a fourth rendered picture including the virtual character; and overlaying the first rendered picture, the second rendered picture, the third rendered picture, and the fourth rendered picture, to obtain the picture in which the virtual character performs interaction with the second character on the same stage in the target scene.

In some arrangements, the rendering processing may be implemented by using a rendering layer. The rendering layer may include an empty-environment rendering layer, a live-shot rendering layer, a virtual-character rendering layer, and a mask rendering layer. During rendering, the server may first perform the picture rendering based on the first mapped data by using the empty-environment rendering layer, to obtain the first rendered picture. The first mapped data may be mapped data of the first scene data that does not include the related data of the interaction between the real characters in the virtual camera. Then, the server may perform the picture rendering based on the second mapped data by using the live-shot rendering layer, to obtain the second rendered picture. The second mapped data may be mapped data of the second scene data that includes the related data of the interaction between the real characters in the virtual camera. Because the real camera mounted on the mechanical arm may be calibrated before the interaction data and the motion-capture data are obtained, an intrinsic matrix (e.g., representing a viewing angle of a lens and a distortion parameter of the camera) and an extrinsic matrix (representing a position and an orientation of the camera in three-dimensional space) of the real camera may be obtained. As the mechanical arm moves, an angle, a position, and the like of a shot or captured real character may change. Therefore, to better represent the three-dimensional images of the first character and the virtual character (corresponding to the first character), the movement data of the mechanical arm may be obtained to create the space mask corresponding to the first character, and the space mask may be rendered by using the mask rendering layer, to obtain the third rendered picture. The virtual character corresponding to the first character may be created, based on the motion-capture data by using the virtual-character rendering layer, at the position associated with the first character, and the picture rendering may be performed on the virtual character, to obtain the fourth rendered picture including the virtual character, e.g., such that the virtual character performs a motion consistent with that of the first character in the fourth rendered picture. Finally, the first rendered picture, the second rendered picture, the third rendered picture, and the fourth rendered picture may be overlaid to obtain an overlaid picture in which the first character is replaced with the virtual character to perform interaction with another real character on the same stage.

In some examples, before performing the picture rendering based on the interaction data and the motion-capture data, the server may further synchronize the play progress of the first scene data with the play progress of the second scene data, to enable the play progress of the first scene data to be consistent with the play progress of the second scene data.

The play progress of the pre-recorded first scene data (e.g., excluding related data of the real actor and the virtual actor) and the play progress of the second scene data (e.g., including the related data of the real actor and the virtual actor) might need to be synchronized, to enable each frame of picture in the first scene data to match each frame of picture in the second scene data.

In some arrangements, the server may synchronize the play progress of the first scene data with the play progress of the second scene data in the following manner: mapping the first scene data and the second scene data to a timeline, and displaying, on the timeline, at least one first key frame corresponding to the first scene data and at least one second key frame corresponding to the second scene data; screening, out of the at least one second key frame, a second target key frame corresponding to a first target key frame in the at least one first key frame; and obtaining a time difference between the first target key frame and the second target key frame, and adjusting, when the time difference is greater than a first time threshold, a position of at least one of the first scene data and the second scene data on the timeline until the time difference is less than a second time threshold.

During the synchronization, it may be assumed that a duration corresponding to the first scene data and a duration corresponding to the second scene data are both 30 seconds. In this case, the first scene data and the second scene data may be synchronized by using a timeline in a game engine. For example, the first scene data and the second scene data may be mapped to the timeline, and the at least one first key frame corresponding to the first scene data and the at least one second key frame corresponding to the second scene data may be displayed on the timeline. An ordinate of the timeline may represent each first key frame corresponding to the first scene data and each second key frame corresponding to the second scene data, and an abscissa may represent a corresponding moment. The second target key frame corresponding to the first target key frame in the at least one first key frame may be screened out of the at least one second key frame (e.g., where background content of the first target key frame is consistent with that of the second target key frame). The time difference between the first target key frame and the second target key frame may be compared. When the time difference is greater than the first time threshold, positions of the first scene data and the second scene data on the timeline may be adjusted until the time difference is less than the second time threshold. For example, when the time difference is adjusted to zero, each frame of picture in the first scene data may match each frame of picture in the second scene data.

In some examples, the server may map the original data in the following manner, to obtain the mapped data of the original data in the virtual camera: obtaining a color mapping relationship between the real camera and the virtual camera; and performing color-space conversion on the original data based on the color mapping relationship, to obtain the mapped data of the original data in the virtual camera. Correspondingly, the server may perform the picture rendering based on the interaction data and the motion-capture data in the following manner, to obtain the picture in which the virtual character performs interaction with the second character in the target scene: performing the picture rendering based on the interaction data and the motion-capture data, to obtain an initial rendered picture in which the virtual character performs interaction with the second character in the target scene; and performing color-space inverse conversion on the initial rendered picture based on the color mapping relationship, to obtain a final rendered picture, that is, the picture in which the virtual character performs interaction with the second character in the target scene, to output the final rendered picture.

In some arrangements, to better enable the virtual camera to replicate a shooting effect (or capturing effect) of the real camera, before the rendering, the color-space conversion may be performed on the original data (such as the first scene data, the second scene data, or the motion-capture data) collected by the real camera. For example, the color mapping relationship between the real camera and the virtual camera may be obtained, and the color-space conversion may be performed on the original data based on the color mapping relationship, to obtain the mapped data of the original data in the virtual camera. It may be assumed that a color gamut of a picture (the original data) shot by the real camera is Rec709, a brightness (gamma) of the picture is 2.4, and an sRGB (standard red, green, and blue) linear color space is used in the virtual camera. Because Rec709 and sRGB may be consistent in color gamut but inconsistent in brightness gamma, data conversion may be performed on gamma by using the following color mapping relationship: C_lin=pow (C_Rec709, 2.4). C_lin may be converted linear data, and C_Rec709 may be original 709 data before conversion. Correspondingly, for a synthesized picture that is outputted finally, the entire gamma might need to be converted from the linear data into 2.4 of Rec709, to match a final output effect, where C_Rec709=pow (C_lin, 1/2.4).

According to some aspects, involved relevant data such as the interaction data and the motion-capture data of the real characters may be considered user-related data. Depending on the use of the aspects described herein, user permission or user agreement may be required, and collection, use and processing of the relevant data might need to comply with relevant laws, regulations, and standards of relevant countries and regions.

The following describes an example arrangement in which one or more aspects described herein may be used. For example, a method for rendering an interaction picture may be used for various scenarios such as live streaming, a video game, or virtual film production. Using live streaming as an example, in a case that a real actor (that is, a real character) interacts and performs with a virtual actor (that is, a first character) on a same stage, usually, the real actor performs on the stage, and motion-capture data of the virtual actor is captured in a motion capture studio. Then, a virtual character is generated by using a computer based on the motion-capture data of the virtual actor (e.g., to replicate the actions performed by the virtual actor), and the virtual character is synthesized on the real stage in real-time, to present a picture in which the real actor and the virtual character are shown performing on the same stage. However, in this existing approach, the real actor and the virtual actor are not in a same space during shooting, and perform independently of each other without true interaction. As a result, in the synthesized picture, real eye contact between the real character and the virtual character may be difficult to achieve, which may result in unnatural interaction and a poor visual experience for a person. However, if the real actor and the virtual actor perform on the same stage, the shot or captured virtual actor cannot be removed in real-time under a moving shot.

Therefore, aspects described herein provide a method for rendering an interaction picture. A movement trajectory of a real camera (lens) on an electronic mechanical arm mounted with the real camera is predetermined. When a real actor and a virtual actor performing interaction on a same stage are shot, the movement trajectory of the real camera may be replicated, so that a picture of the virtual actor in the real camera may be removed in real-time, and interaction between real characters is replicated, thereby improving realness or authenticity of the interaction between the real character and a virtual character in a picture obtained through rendering, enabling the real actor and the virtual actor to perform on the same stage, and improving naturalness of the interaction between the real actor and the virtual actor.

Figure 4:
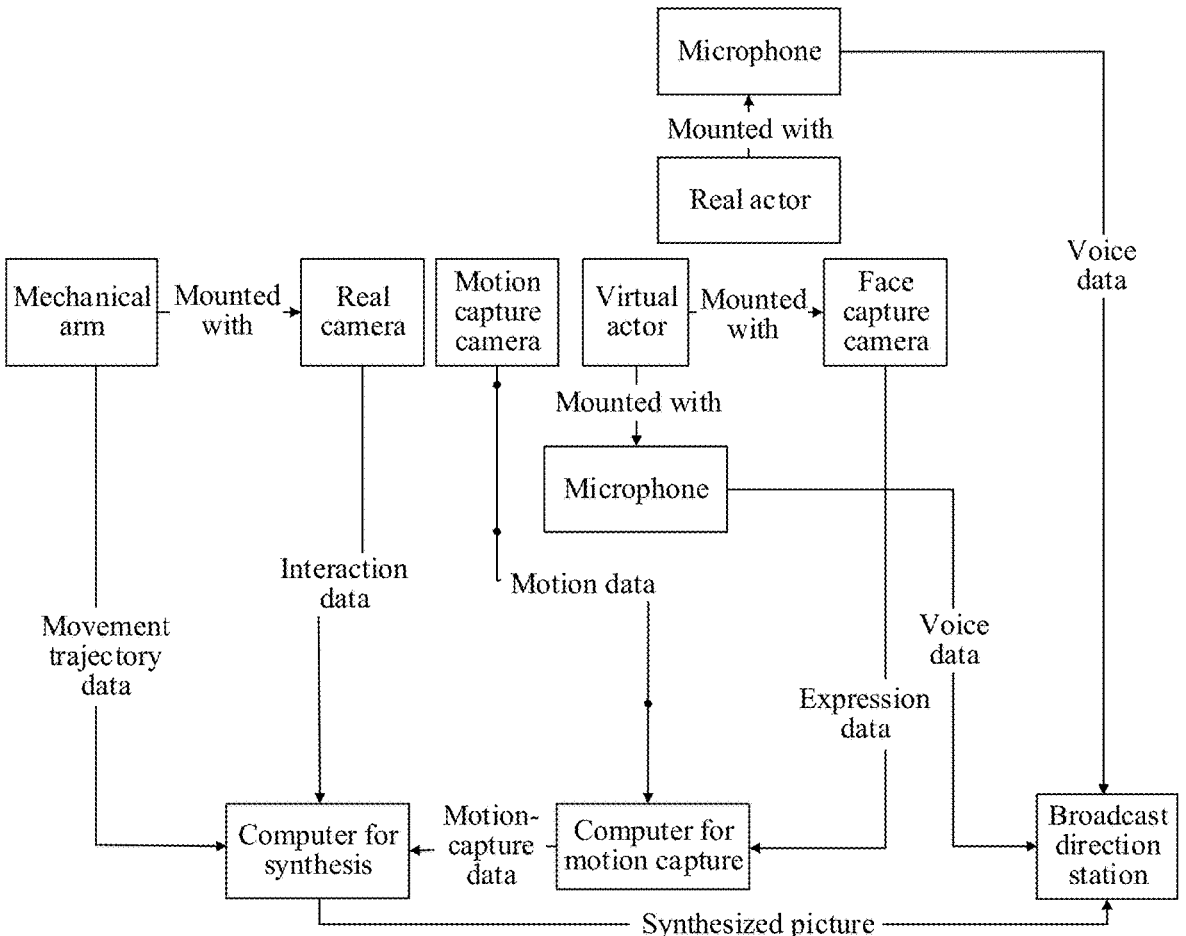
FIG. 4 is a schematic diagram of an example architecture of a system for rendering an interaction picture according to one or more aspects described herein.

FIG. 4 is a schematic diagram of an architecture of an example system for rendering an interaction picture. The architecture includes a mechanical arm, a real camera mounted on the mechanical arm, a face capture camera, a motion capture camera, and a microphone that are mounted on a virtual actor, a computer for synthesis, a computer for motion capture, a broadcast direction station, and the like. The mechanical arm may collect movement trajectory data thereof, and transmit the movement trajectory data to the computer for synthesis. The real camera mounted on the mechanical arm may be configured to collect interaction data of a real actor and the virtual actor performing on a same stage, and transmit the interaction data to the computer for synthesis (that is, the foregoing server, in which a component or a device configured to perform picture rendering, such as a game engine, is embedded). The motion capture camera may be configured to capture motion data of the virtual actor, the microphone may be configured to collect voice data of the real actor and the virtual actor, and the face capture camera may be configured to capture expression data of the virtual actor. The face capture camera and the motion capture camera may transmit the collected data (collectively referred to as motion-capture data) to the computer for motion capture. The computer for motion capture may transmit the motion-capture data of the virtual actor to the computer for synthesis. The microphone may transmit the collected voice data to the broadcast direction station. After receiving the movement trajectory data, the interaction data, and the motion-capture data, the computer for synthesis may perform picture rendering based on the movement trajectory data, the interaction data, and the motion-capture data, to obtain a picture in which the virtual character replacing the virtual actor performs with the real actor on the same stage, and transmit the synthesized picture to the broadcast direction station. The broadcast direction station may output, in real-time based on the synthesized picture and the voice data, a picture in which the virtual character corresponding to the virtual actor performs and interacts with the real actor on the same stage.

For uses such as virtual film production, FIG. 5A is a schematic flowchart of an example method for rendering an interaction picture. The method may include the following operations.

Operation 201: When a real actor does not perform interaction with a virtual actor on a same stage in a background scene, a mechanical arm moves along a target trajectory, and during the movement of the mechanical arm, a real camera mounted on the mechanical arm is controlled to collect first scene data in the background scene.

In some examples, the background scene may be an LED background wall (the LED background wall refers to continuous parts of an LED wall structure, and may be a flat or curved rectangle) in a virtual photo studio. A high-precision image presented by the LED background wall may be equivalent to a real scene, the real actor and the virtual actor may perform more naturally, and a photographer or videographer may find the captured image or video to be more natural.

Figure 6:
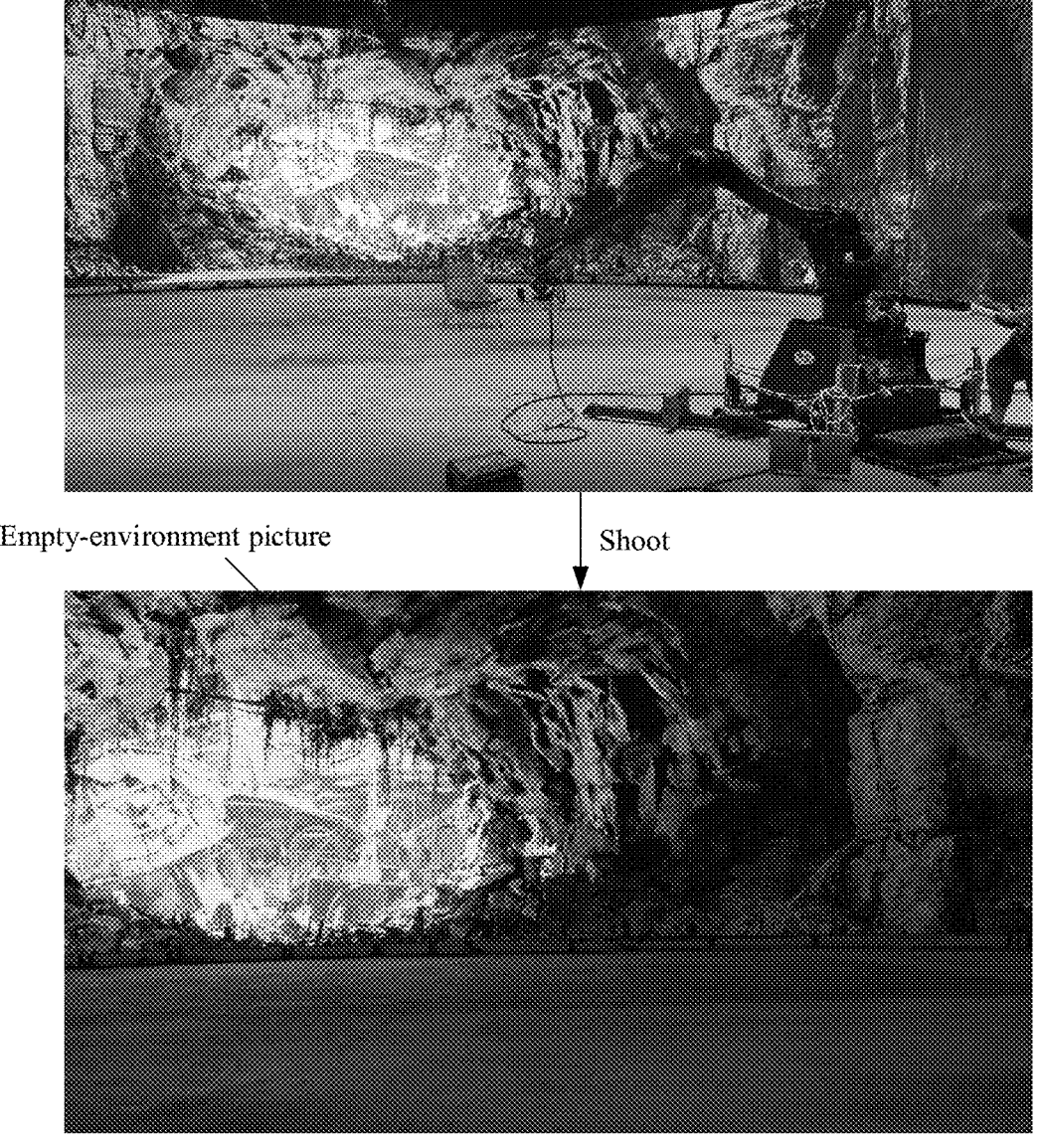
FIG. 6 is a schematic diagram of an example shooting process according to one or more aspects described herein.

In some arrangements, a movement trajectory (for example, the target trajectory) of the mechanical arm may be set based on content that needs to be shot. Shooting is performed along repeated movement trajectories, so that object replacement can be implemented in a form of multiple shootings. During the movement of the mechanical arm, the real camera may be driven to shoot the first scene data (that is, a background picture or an empty-environment picture) of the background scene along the target trajectory. In this case, the first scene data does not include related data of the real actor and the virtual actor. FIG. 6 is an example schematic diagram of shooting. The empty-environment picture excluding the real actor and the virtual actor may be shot by the real camera mounted on the mechanical arm.

Operation 202: When the real actor performs interaction with the virtual actor on the same stage in the same background scene, control the mechanical arm to move along the target trajectory, to record second scene data that the real actor performs interaction with the virtual actor on the same stage.

In some examples, a face capture camera, a motion capture camera, a microphone, and the like mounted on (or otherwise attached to) the real actor may be integrated on the mechanical arm, to record, by using the mechanical arm, the second scene data where the real actor performs interaction with the virtual actor. The second scene data may include the original background scene.

Operation 203: Determine a first coordinate conversion relationship between the real camera and the mechanical arm, and a second coordinate conversion relationship between the mechanical arm and a virtual camera in a computer for synthesis.

The virtual camera may be configured for performing picture rendering, and may be embedded in a game engine. To enable the virtual camera to replicate a movement trajectory of the real camera to replace the virtual actor with a virtual character, the real camera mounted on the mechanical arm might need to be calibrated, to obtain an intrinsic matrix and an extrinsic matrix of the real camera. The intrinsic matrix may represent a viewing angle of a lens and a distortion parameter of the camera. The extrinsic matrix may represent a position and an orientation (position offset) of the camera in three-dimensional space.

After the real camera is calibrated, before the first coordinate conversion relationship between the real camera and the mechanical arm is determined, a third coordinate conversion relationship between the real camera and an end actuator (configured to connect the mechanical arm to the real camera) of the mechanical arm and a fourth coordinate conversion relationship between the end actuator of the mechanical arm and a base coordinate system of the mechanical arm might need to be first obtained. The first coordinate conversion relationship between the real camera and the mechanical arm may be obtained based on the third coordinate conversion relationship and the fourth coordinate conversion relationship, for example, by multiplying the third coordinate conversion relationship by the fourth coordinate conversion relationship. Similarly, the second coordinate conversion relationship between the mechanical arm and the virtual camera might need to be determined, to map data shot by the real camera to the virtual camera.

Operation 204: Synchronize a play progress of the first scene data with a play progress of the second scene data, to enable the play progress of the second scene data to be consistent with the play progress of the first scene data.

The play progress of the pre-recorded first scene data (excluding related data of the real actor and the virtual actor) and the play progress of the second scene data (including the related data of the real actor and the virtual actor) might need to be synchronized, to enable each frame of picture in the first scene data to match each frame of picture in the second scene data.

During the synchronization, it may be assumed that a duration corresponding to the first scene data and a duration corresponding to the second scene data are both 30 seconds. In this case, the first scene data and the second scene data may be mapped to a timeline in a game engine by using the timeline, and at least one first key frame corresponding to the first scene data and at least one second key frame corresponding to the second scene data may be displayed on the timeline. An ordinate of the timeline may represent each first key frame corresponding to the first scene data and each second key frame corresponding to the second scene data, and an abscissa may represent a corresponding moment. A second target key frame corresponding to a first target key frame in the at least one first key frame may be screened out of the at least one second key frame. A time difference between the first target key frame and the second target key frame may be obtained, and when the time difference is greater than a first time threshold, positions of the first scene data and the second scene data on the timeline may be adjusted until the time difference is less than a second time threshold. For example, when the time difference is adjusted to zero, each frame of picture in the first scene data and each frame of picture in the second scene data that are displayed by the virtual camera may then match.

Operation 205: Map the first scene data and the second scene data separately based on the first coordinate conversion relationship and the second coordinate conversion relationship, to obtain corresponding first mapped data and second mapped data.

When the play progress of the second scene data is adjusted to be consistent with the play progress of the first scene data, the first scene data may be mapped based on the first coordinate conversion relationship and the second coordinate conversion relationship, to obtain the first mapped data of the first scene data in the virtual camera. For example, the first scene data may be first mapped to a coordinate system of the mechanical arm based on the first coordinate conversion relationship, to obtain intermediate background mapped data. Then, the intermediate background mapped data may be mapped to a coordinate system of the virtual camera based on the second coordinate conversion relationship, to obtain the first mapped data. Similarly, the second scene data may be mapped based on the first coordinate conversion relationship and the second coordinate conversion relationship, to obtain the second mapped data of the second scene data in the virtual camera. For example, the second scene data may be first mapped to the coordinate system of the mechanical arm based on the first coordinate conversion relationship, to obtain intermediate original mapped data. Then, the intermediate original mapped data may be mapped to the coordinate system of the virtual camera based on the second coordinate conversion relationship, to obtain the second mapped data.

Operation 206: Perform picture rendering on the first mapped data, to obtain a corresponding first rendered picture.

Operation 207: Perform picture rendering on the second mapped data, to obtain a corresponding second rendered picture.

Operation 208: Create, based on movement data of the mechanical arm, a space mask corresponding to the virtual actor, and perform picture rendering on the space mask, to obtain a third rendered picture.

Operation 209: Create a virtual character corresponding to the virtual actor at a position associated with the virtual actor, and perform picture rendering on the virtual character based on motion-capture data of the virtual actor, to obtain a fourth rendered picture including the virtual character.

Operation 210: Overlay the first rendered picture, the second rendered picture, the third rendered picture, and the fourth rendered picture, to obtain a synthesized picture in which the virtual character corresponding to the virtual actor performs interaction with the real actor on the same stage.

Operation 211: Output, in real-time based on the synthesized picture and voice data, a picture in which the virtual character corresponding to the virtual actor performs and interacts with the real actor on the same stage.

In the foregoing manner, virtual film production may be performed in real-time in a shot using an LED wall. For example, a real-time image may be projected on the LED wall behind the real actor and the virtual actor, and the virtual actor in the real-time image may be replaced with the virtual character. In this way, image output of the virtual camera in a real-time engine follows and is combined with that of the real camera, to generate a final image completely in the shot, so as to achieve an effect that the real actor and the virtual character corresponding to the virtual actor are filmed on the same stage.

For live streaming, FIG. 5B is a schematic flowchart of an example method for rendering an interaction picture. The method may include the following operations.

Operation 301: When a real actor does not perform interaction with a virtual actor on a same stage in a background scene, a mechanical arm moves along a target trajectory, and during the movement of the mechanical arm, a real camera mounted on the mechanical arm is controlled to collect first scene data in the background scene.

A movement trajectory (for example, the target trajectory) of the mechanical arm may be set based on content that needs to be shot or captured. During the movement of the mechanical arm along the target trajectory, the real camera may be driven to shoot the first scene data (e.g., a background picture or an empty-environment picture) of the background scene in advance along the target trajectory. In this case, the first scene data does not include related data of the real actor and the virtual actor, and the first scene data is cached in an internal memory.

Operation 302: Determine a first coordinate conversion relationship between the real camera and the mechanical arm, and a second coordinate conversion relationship between the mechanical arm and a virtual camera in a computer for synthesis.

The virtual camera may be configured for performing picture rendering, and may be embedded in a game engine of the computer for synthesis. To enable the virtual camera to replicate a movement trajectory of the real camera to replace the virtual actor with a virtual character, the real camera mounted on the mechanical arm might need to be calibrated, to obtain an intrinsic matrix and an extrinsic matrix of the real camera. The intrinsic matrix may represent a viewing angle of a lens and a distortion parameter of the camera. The extrinsic matrix may represent a position and an orientation (position offset) of the camera in three-dimensional space.

After the real camera is calibrated, before the first coordinate conversion relationship between the real camera and the mechanical arm is determined, a third coordinate conversion relationship between the real camera and an end actuator (configured to connect the mechanical arm to the real camera) of the mechanical arm and a fourth coordinate conversion relationship between the end actuator of the mechanical arm and a base coordinate system of the mechanical arm might need to be first obtained. The first coordinate conversion relationship between the real camera and the mechanical arm may be obtained based on the third coordinate conversion relationship and the fourth coordinate conversion relationship, for example, by multiplying the third coordinate conversion relationship by the fourth coordinate conversion relationship. Similarly, the second coordinate conversion relationship between the mechanical arm and the virtual camera might need to be determined, to map data shot by the real camera to the virtual camera.

Operation 303: When the real actor performs interaction with the virtual actor on the same stage in the same background scene, synchronize a moment at which a play instruction for the first scene data is triggered with a moment at which a movement instruction for the mechanical arm is triggered.

The play instruction may be configured for triggering playing of the pre-shot first scene data (that is, the empty-environment picture), and the movement instruction may be configured for triggering the mechanical arm to start to move along the target trajectory to shoot a person picture (including an interaction picture of the real actor and the virtual actor and the background picture). During the synchronization, time code of the virtual camera (the game engine) is set, to be synchronized with that of the real camera. For example, a frame rate of 25 FPS is maintained synchronously. The pre-recorded first scene data is cached to avoid lag of a hard disk and an internal memory. The first scene data and second scene data are synchronized by using a timeline in the game engine.

In some cases (for example, where there is no delay in data transmission), when the pre-shot empty-environment picture starts to be played, the mechanical arm might need to be simultaneously started to move to shoot the person picture. It may be assumed that the play instruction is triggered at a first moment (e.g., the pre-shot empty-environment picture starts to be played at the first moment), and the movement instruction may be triggered at a second moment (e.g., the mechanical arm is started at the second moment to move along the target trajectory). In such cases, the first moment and the second moment may be the same moment. However, in some cases, a delay in data transmission may exist, and if the movement instruction is triggered while the play instruction is triggered (e.g., the mechanical arm is started to move while the pre-shot empty-environment picture starts to be played), a case in which the played pre-recorded empty-environment picture does not match the background picture in the person picture displayed by the virtual camera may result. For example, a target duration (for example, one second) might need to be spent on transmitting, to the virtual camera, interaction data that is shot by the real camera during the movement of the mechanical arm and that includes the interaction picture of the real actor performing interaction with the virtual actor on the same stage. If the mechanical arm is started to move while the pre-shot empty-environment picture starts to be played, the pre-shot empty-environment picture played with same content may be earlier (for example, out-of-sync by being one second earlier) than the picture displayed by the virtual camera. Therefore, to enable the pre-shot empty-environment picture played with the same content to be consistent and in-sync with the background picture displayed by the virtual camera, the first moment might need to be set to a moment that is later than the second moment by the target duration (for example, one second). In other words, the play instruction may be triggered the target duration (for example, one second) after the movement instruction is triggered.

Operation 304: Control the mechanical arm at the second moment to move along the target trajectory, to record the second scene data that the real actor performs interaction with the virtual actor on the same stage, and play the pre-recorded first scene data at the first moment.

After the moment at which the play instruction for the first scene data is triggered and the moment at which the movement instruction for the mechanical arm is triggered are synchronized, the movement of the mechanical arm and the playing of the first scene data may be controlled based on the synchronized moment.

Operation 305: Map the first scene data and the second scene data separately based on the first coordinate conversion relationship and the second coordinate conversion relationship, to obtain corresponding first mapped data and second mapped data.

The first scene data may be mapped based on the first coordinate conversion relationship and the second coordinate conversion relationship. For example, the first scene data may be first mapped to a coordinate system of the mechanical arm based on the first coordinate conversion relationship, to obtain intermediate background mapped data. Then, the intermediate background mapped data may be mapped to a coordinate system of the virtual camera based on the second coordinate conversion relationship, to obtain the first mapped data. Similarly, the second scene data may be mapped based on the first coordinate conversion relationship and the second coordinate conversion relationship, to obtain the second mapped data of the second scene data in the virtual camera. For example, the second scene data may be first mapped to the coordinate system of the mechanical arm based on the first coordinate conversion relationship, to obtain intermediate original mapped data. Then, the intermediate original mapped data may be mapped to the coordinate system of the virtual camera based on the second coordinate conversion relationship, to obtain the second mapped data.

Operation 306: Perform picture rendering on the first mapped data, to obtain a corresponding first rendered picture.

Operation 307: Perform picture rendering on the second mapped data, to obtain a corresponding second rendered picture.

Operation 308: Create, based on movement data of the mechanical arm, a space mask corresponding to the virtual actor, and perform picture rendering on the space mask, to obtain a third rendered picture.

Operation 309: Create a virtual character corresponding to the virtual actor at a position associated with the virtual actor, and perform picture rendering on the virtual character based on motion-capture data of the virtual actor, to obtain a fourth rendered picture including the virtual character.

Operation 310: Overlay the first rendered picture, the second rendered picture, the third rendered picture, and the fourth rendered picture, to obtain a synthesized picture in which the virtual character corresponding to the virtual actor performs interaction with the real actor on the same stage.

Operation 311: Output, in real-time based on the synthesized picture and voice data, a picture in which the virtual character corresponding to the virtual actor performs and interacts with the real actor on the same stage.

Figure 7:
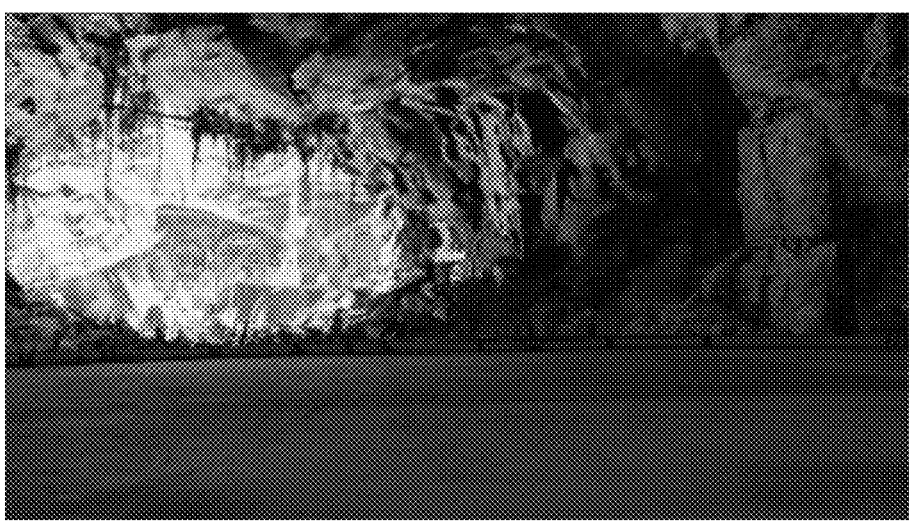
FIG. 7 is a schematic diagram of an example rendering process according to one or more aspects described herein.
Figure 8:
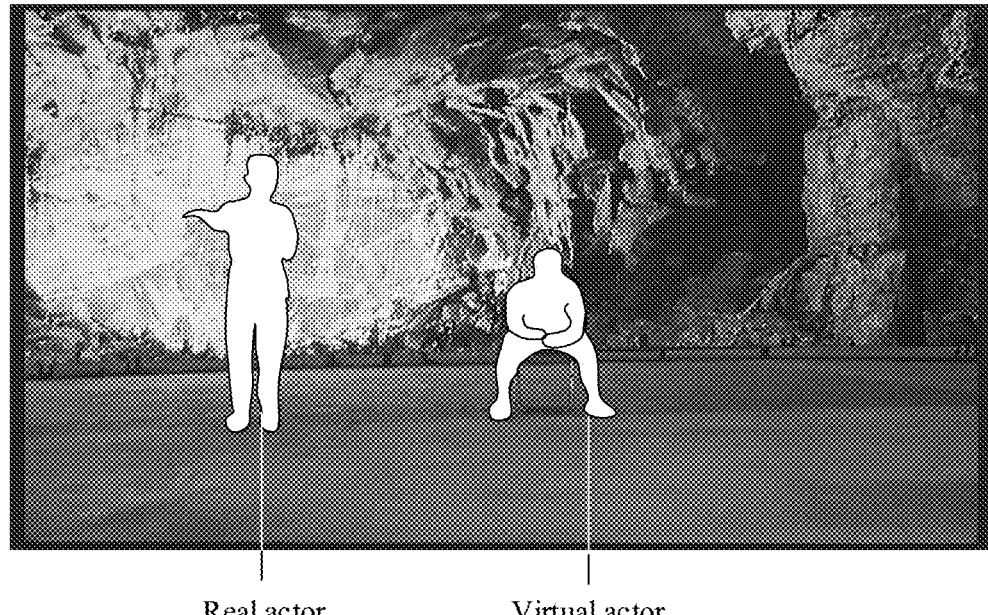
FIG. 8 is a schematic diagram of an example rendering process according to one or more aspects described herein.

The rendering processing in the foregoing operation 208 to operation 212, or operation 306 to operation 310 may be performed or implemented by using a rendering layer, and the operations may be performed in parallel or in series. The rendering layer may include an empty-environment rendering layer, a live-shot rendering layer, a virtual-character rendering layer, and a mask rendering layer. FIG. 7 is an example schematic diagram of rendering. As shown in FIG. 7, during rendering, a virtual camera (or a game engine) may first perform, by using the empty-environment rendering layer, picture rendering on first mapped data of first scene data excluding related data of interaction between a real actor and a virtual actor in the virtual camera, to obtain a first rendered picture. FIG. 8 is another example schematic diagram of rendering. Picture rendering may be performed on, by using the live-shot rendering layer, second mapped data of second scene data (including the related data of the interaction between the real actor and the virtual actor) in the virtual camera, to obtain a second rendered picture.

Figure 9:
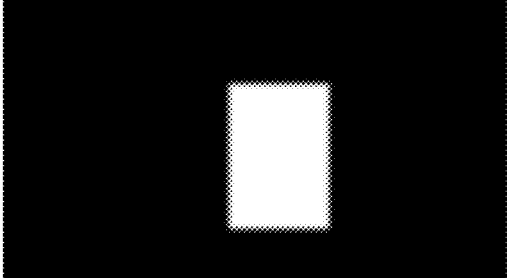
FIG. 9 is a schematic diagram of an example rendering process according to one or more aspects described herein.

Because a real camera mounted on a mechanical arm may be calibrated before interaction data and motion-capture data are obtained, an intrinsic matrix (representing a viewing angle of a lens and a distortion parameter of the camera) and an extrinsic matrix (representing a position and an orientation of the camera in three-dimensional space) of the real camera may be obtained. To better represent three-dimensional images of a first character and a virtual character (corresponding to the first character) to completely match or replicate the virtual actor, movement data of the mechanical arm may be obtained to create a (three-dimensional) space mask corresponding to the first character, and the space mask may be rendered by using the mask rendering layer, to obtain a third rendered picture. FIG. 9 is another example schematic diagram of rendering. To make the rendered picture more natural, a pixel value of rendering performed by the mask rendering layer may be adjusted. For example, a lower set pixel value may indicate a more significant feathering effect and more natural fusion.

Figure 10:
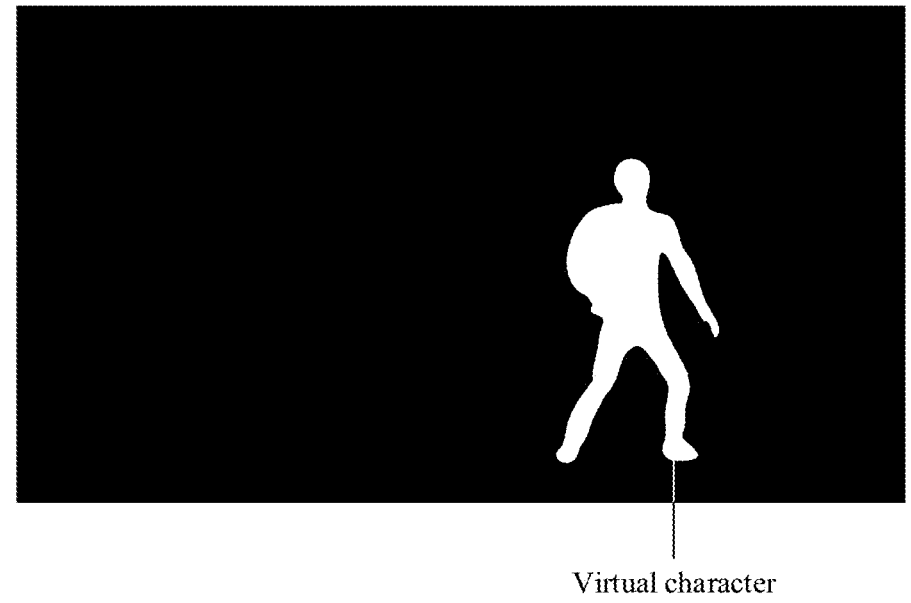
FIG. 10 is a schematic diagram of an example rendering process according to one or more aspects described herein.

In operation 209 or operation 309, the motion-capture data collected by a face capture camera and a motion capture camera may be original motion-capture data collected by the real camera. In the same manner, the original motion-capture data may be mapped to the virtual camera to obtain motion-capture data in the virtual camera. A virtual character corresponding to the virtual actor may be created at a position associated with the virtual actor, and picture rendering may be performed on the virtual character based on the motion-capture data in the virtual camera by using the virtual-character rendering layer, to obtain a fourth rendered picture including the virtual character. FIG. 10 is another example schematic diagram of rendering. As shown in FIG. 10, the virtual character performs a motion consistent with that of the virtual actor in the fourth rendered picture.

Figure 11:
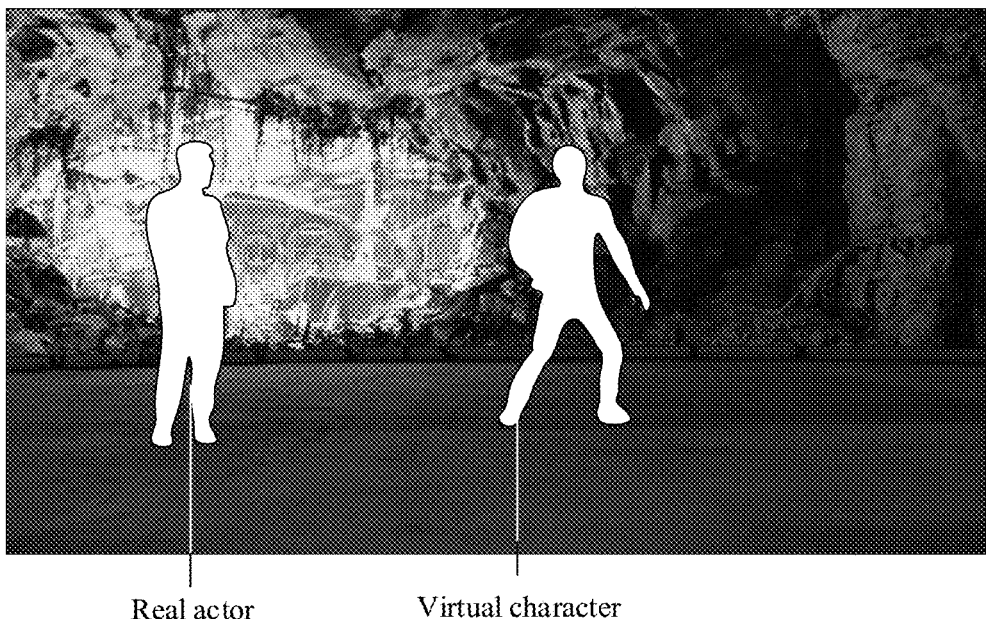
FIG. 11 is a schematic diagram of an example rendering process according to one or more aspects described herein.

FIG. 11 is another example schematic diagram of rendering. The first rendered picture, the second rendered picture, the third rendered picture, and the fourth rendered picture may be overlaid. In an obtained picture, the virtual character replacing the virtual actor performs with another real character on the same stage.

In some arrangements, to better enable the virtual camera to replicate a shoot or capture effect of the real camera, before the rendering, color-space conversion may be performed on the original data (such as the first scene data, the second scene data, or the motion-capture data) collected by the real camera. For example, a color mapping relationship between the real camera and the virtual camera may be obtained, and the color-space conversion may be performed on the original data based on the color mapping relationship, to obtain the mapped data of the original data in the virtual camera. It may be assumed that a color gamut of a picture (the original data) shot by the real camera is Rec709, a brightness (gamma) of the picture is 2.4, and an sRGB (standard red, green, and blue) linear color-space may be used in the virtual camera. Because Rec709 and sRGB may be consistent in color gamut but inconsistent in brightness gamma, data conversion may be performed on gamma by using the following color mapping relationship: C_lin=pow (C_Rec709, 2.4). C_lin is converted linear data, and C_Rec709 may be original 709 data before conversion. Correspondingly, for a synthesized picture that is outputted finally, the entire gamma might need to be converted from the linear data into 2.4 of Rec709, to match a final output effect, where C_Rec709=pow (C_lin, 1/2.4).

In the foregoing manner, a movement trajectory of a real camera (lens) on an electronic mechanical arm mounted with the real camera may be predetermined. When a real actor and a virtual actor performing interaction on a same stage are shot, the movement trajectory of the real camera may be replicated, so that a picture of the virtual actor in the real camera is removed in real-time, thereby enabling the real actor and the virtual actor to perform on the same stage, and improving naturalness and authenticity of interaction between the real actor and the virtual actor.

The following continues to describe an example structure an apparatus 555 for rendering an interaction picture. In some arrangements, apparatus 555 may include a software module, and the software module for rendering an interaction picture stored in the memory 550 in FIG. 2 may include:

> an obtaining module 5551, configured to obtain interaction data of at least two real characters performing interaction with each other in a target scene and motion-capture data of a first character in the at least two real characters, where the motion-capture data is configured for driving a virtual character corresponding to the first character to perform an interactive action consistent with that of the first character; and
> a rendering module 5552, configured to perform picture rendering based on the interaction data and the motion-capture data, to obtain a picture in which the virtual character performs interaction with a second character in the target scene,
> where the second character is a character other than the first character in the at least two real characters.

In some arrangements, the obtaining module may be further configured to obtain original data that is recorded by a real camera of the at least two real characters performing interaction with each other in the target scene, where the real camera is mounted on a mechanical arm, and the mechanical arm is connected to the real camera through an end actuator of the mechanical arm; determine a first coordinate conversion relationship between the real camera and the mechanical arm and a second coordinate conversion relationship between the mechanical arm and a virtual camera configured for performing the picture rendering; and map the original data based on the first coordinate conversion relationship and the second coordinate conversion relationship, to obtain mapped data of the original data in the virtual camera, and use the mapped data as the obtained interaction data.

In some examples, the obtaining module may be further configured to obtain a third coordinate conversion relationship between the real camera and the end actuator of the mechanical arm, and a fourth coordinate conversion relationship between the end actuator of the mechanical arm and a base coordinate system of the mechanical arm; and determine the first coordinate conversion relationship between the real camera and the mechanical arm based on the third coordinate conversion relationship and the fourth coordinate conversion relationship.

According to some aspects, the obtaining module may be further configured to obtain first scene data of the target scene, where the first scene data is the first scene data that is recorded by the real camera during movement of the mechanical arm along a target trajectory and that does not include the at least two real characters; obtain second scene data of the target scene, where the second scene data is the second scene data that is recorded by the real camera during the movement of the mechanical arm along the target trajectory when the at least two real characters perform interaction with each other in the target scene and that includes the at least two real characters; and determine the first scene data and the second scene data as the original data of the at least two real characters performing interaction with each other on a same stage.

In some examples, the obtaining module may be further configured to receive a movement instruction for the mechanical arm, where the movement instruction is configured for instructing the mechanical arm to move along the target trajectory; control, in response to the movement instruction for the mechanical arm, the mechanical arm to move along the target trajectory and control the real camera to record the first scene data during the movement of the mechanical arm; obtain a receiving moment of the movement instruction and target duration required for transmitting the second scene data from the real camera to the virtual camera; and start timing at the receiving moment, play the first scene data when duration reaches the target duration, and determine the played first scene data and the recorded second scene data as the original data of the at least two real characters performing interaction with each other on the same stage.

In some arrangements, the obtaining module may be further configured to map the first scene data based on the first coordinate conversion relationship and the second coordinate conversion relationship, to obtain first mapped data of the first scene data in the virtual camera; map the second scene data based on the first coordinate conversion relationship and the second coordinate conversion relationship, to obtain second mapped data of the second scene data in the virtual camera; and use the first mapped data and the second mapped data as the mapped data of the original data in the virtual camera.

According to some aspects, the rendering module may be further configured to perform picture rendering on the first mapped data and the second mapped data respectively, to obtain a corresponding first rendered picture and second rendered picture; create a space mask corresponding to the first character, and perform picture rendering on the space mask, to obtain a third rendered picture; create, based on the motion-capture data, the virtual character corresponding to the first character at a position associated with the first character, and perform picture rendering on the virtual character, to obtain a fourth rendered picture including the virtual character; and overlay the first rendered picture, the second rendered picture, the third rendered picture, and the fourth rendered picture, to obtain the picture in which the virtual character performs interaction with the second character in the target scene.

In some arrangements, the apparatus may further include: a synchronization module, configured to, before the picture rendering is performed based on the interaction data and the motion-capture data, map the first scene data and the second scene data to a timeline, and display, on the timeline, at least one first key frame corresponding to the first scene data and at least one second key frame corresponding to the second scene data; screen, out of the at least one second key frame, a second target key frame corresponding to a first target key frame in the at least one first key frame; and obtain a time difference between the first target key frame and the second target key frame, and adjust, when the time difference is greater than a first time threshold, a position of at least one of the first scene data and the second scene data on the timeline until the time difference is less than a second time threshold.

In some examples, the obtaining module may be further configured to obtain a color mapping relationship between the real camera and the virtual camera; and perform color-space conversion on the original data based on the color mapping relationship, to obtain the mapped data of the original data in the virtual camera. Correspondingly, the rendering module is further configured to perform the picture rendering based on the interaction data and the motion-capture data, to obtain an initial rendered picture in which the virtual character performs interaction with the second character in the target scene; and perform color-space inverse conversion on the initial rendered picture based on the color mapping relationship, to obtain a final rendered picture, to output the final rendered picture.

In some arrangements, the obtaining module may be further configured to obtain, when the first character in the at least two real characters wears a motion capture device, position change data that is of a marked point on the motion capture device and that is captured by the real camera, and use the position change data as motion data of the first character, where the marked point corresponds to a skeletal key point of the first character; obtain, when the first character is mounted with an expression capture device, expression data that is of the first character and that is captured by the expression capture device; obtain, when the first character is mounted with a voice collection device, voice data that is of the first character and that is collected by the voice collection device; and determine at least one of the motion data, the expression data, and the voice data that are of the first character as the motion-capture data.

According to some aspects, the rendering module may be further configured to perform the picture rendering based on the interaction data, to obtain a first interaction picture in which the at least two real characters perform interaction with each other on the same stage; create the space mask corresponding to the first character, and render the space mask into the first interaction picture, to replace the first character with the space mask, so as to obtain a second interaction picture in which the space mask performs interaction with another character other than the first character in the at least two real characters; and create the virtual character corresponding to the first character at a position of the space mask, and render the virtual character into the second interaction picture based on the motion-capture data, to obtain the picture in which the virtual character performs interaction with the another character on the same stage in the target scene.

Aspects described herein provide a computer program product or a computer program. The computer program product or the computer program may include computer instructions, and the computer instructions may be stored in a computer-readable storage medium. A processor of a computer device may read the computer instructions from the computer-readable storage medium, and execute the computer instructions, to enable the computer device to perform the method for rendering an interaction picture.

Aspects described herein provide a computer-readable storage medium, having executable instructions stored therein. When the executable instructions are executed by a processor, the processor may be caused to perform the method for rendering an interaction picture, such as the method shown in FIG. 3.

In some examples, the computer-readable storage medium may be a memory such as a read-only memory (ROM), a random access memory (RAM), an erasable programmable read-only memory (EPROM), an electrically erasable programmable read-only memory (EEPROM), a flash memory, a magnetic memory, a compact disc, or a CD-ROM; or may be various devices including one of or any combination of the foregoing memories.

According to some aspects, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

As an example, the executable instructions may, but do not necessarily, correspond to a file in a file system, and may be stored in a part of a file that saves another program or other data, for example, may be stored in one or more scripts in a hypertext markup language (HTML) file, may be stored in a file that is specially used for a program in discussion, or may be stored in a plurality of collaborative files (for example, files storing one or more modules, subprograms, or code parts).

As an example, the executable instructions may be deployed to be executed on one computing device, or deployed to be executed on a plurality of computing devices at the same location, or deployed to be executed on a plurality of computing devices that are distributed in a plurality of locations and interconnected by using a communication network.

The foregoing descriptions are examples of various aspects of the disclosure and are not intended to limit the protection scope of this application. Any modification, equivalent replacement, or improvement made without departing from the spirit and range of this application shall fall within the protection scope of this application.

What is claimed is:

1. A method for electronically rendering an interaction picture comprising a virtual character, the method comprising:

obtaining, by an image rendering device from an image capture device comprising a real camera, interaction data of at least two real characters performing interaction with each other in a target scene and motion-capture data of a first character in the at least two real characters, the obtaining the interaction data of the at least two real characters including:

obtaining, by the image rendering device, original data that is recorded by the real camera of the at least two real characters performing interaction with each other in the target scene, wherein the real camera is mounted on a mechanical arm, and the mechanical arm is connected to the real camera through an end actuator of the mechanical arm;

determining, by the image rendering device, a first coordinate conversion relationship between the real camera and the mechanical arm, and a second coordinate conversion relationship between the mechanical arm and a virtual camera; and mapping, by the image rendering device, the original data based on the first coordinate conversion relationship and the second coordinate conversion relationship, to obtain mapped data of the original data in the virtual camera, and determining the mapped data as the interaction data, the motion-capture data being configured for determining a movement of the virtual character, the virtual character corresponding to the first character, to perform an interactive action consistent with one or more movements of the first character; and performing, by the image rendering device, picture rendering based on the interaction data and the motion-capture data, to generate an image in which the virtual character performs interaction with a second character in the target scene, wherein the image rendering device includes the virtual camera and the virtual camera is configured for performing the picture rendering, the second character being a character other than the first character in the at least two real characters.

2. The method according to claim 1, wherein the determining, by the image rendering device, a first coordinate conversion relationship between the real camera and the mechanical arm comprises:

obtaining a third coordinate conversion relationship between the real camera and the end actuator of the mechanical arm, and a fourth coordinate conversion relationship between the end actuator of the mechanical arm and a base coordinate system of the mechanical arm; and determining the first coordinate conversion relationship between the real camera and the mechanical arm based on the third coordinate conversion relationship and the fourth coordinate conversion relationship.

3. The method according to claim 1, wherein the obtaining, by the image rendering device, original data that is recorded by a real camera of the at least two real characters performing interaction with each other in the target scene comprises:

obtaining first scene data of the target scene, wherein the first scene data is scene data that is recorded by the real camera during movement of the mechanical arm along a target trajectory and that does not comprise the at least two real characters;

obtaining second scene data of the target scene, wherein the second scene data is scene data that is recorded by the real camera during the movement of the mechanical arm along the target trajectory when the at least two real characters perform interaction with each other in the target scene and that comprises the at least two real characters; and determining the first scene data and the second scene data as the original data.

4. The method according to claim 3, wherein the obtaining, by the image rendering device, first scene data of the target scene comprises:

receiving a movement instruction for the mechanical arm, wherein the movement instruction is configured for instructing the mechanical arm to move along the target trajectory;

controlling, in response to the movement instruction for the mechanical arm, the mechanical arm to move along the target trajectory; and controlling the real camera to record the first scene data during the movement of the mechanical arm.

5. The method according to claim 3, wherein the mapping the original data based on the first coordinate conversion relationship and the second coordinate conversion relationship, to obtain mapped data of the original data in the virtual camera comprises:

mapping the first scene data based on the first coordinate conversion relationship and the second coordinate conversion relationship, to obtain first mapped data of the first scene data in the virtual camera;

mapping the second scene data based on the first coordinate conversion relationship and the second coordinate conversion relationship, to obtain second mapped data of the second scene data in the virtual camera; and determining the first mapped data and the second mapped data as the mapped data of the original data in the virtual camera.

6. The method according to claim 5, wherein the performing picture rendering based on the interaction data and the motion-capture data, to obtain a picture in which the virtual character performs interaction with a second character in the target scene comprises:

performing picture rendering based on the first mapped data, to obtain a first rendered picture, and performing picture rendering based on the second mapped data, to obtain a second rendered picture;

creating a space mask corresponding to the first character, and performing picture rendering on the space mask, to obtain a third rendered picture;

generating, based on the motion-capture data, the virtual character corresponding to the first character at a position associated with the first character, and performing picture rendering on the virtual character, to obtain a fourth rendered picture comprising the virtual character; and overlaying the first rendered picture, the second rendered picture, the third rendered picture, and the fourth rendered picture, to obtain the picture in which the virtual character performs interaction with the second character in the target scene.

7. The method according to claim 4, wherein the determining the first scene data and the second scene data as the original data comprises:

obtaining a receiving moment of the movement instruction and a target duration required for transmitting the second scene data from the real camera to the virtual camera; and starting a timer at the receiving moment, playing the first scene data when the timer reaches the target duration, and determining the played first scene data and the recorded second scene data as the original data.

8. The method according to claim 4, wherein before the performing picture rendering based on the interaction data and the motion-capture data, the method further comprises:

mapping the first scene data and the second scene data to a timeline, and displaying, on the timeline, at least one first key frame corresponding to the first scene data and at least one second key frame corresponding to the second scene data;

screening, out of the at least one second key frame, a second target key frame corresponding to a first target key frame in the at least one first key frame; and obtaining a time difference between the first target key frame and the second target key frame, and adjusting, when the time difference is greater than a first time threshold, a position of at least one of the first scene data and the second scene data on the timeline until the time difference is less than a second time threshold.

9. The method according to claim 1, wherein the mapping the original data to obtain mapped data of the original data in the virtual camera comprises:

obtaining a color mapping relationship between the real camera and the virtual camera; and performing color-space conversion on the original data based on the color mapping relationship, to obtain the mapped data of the original data in the virtual camera; and the performing picture rendering based on the interaction data and the motion-capture data, to obtain a picture in which the virtual character performs interaction with a second character in the target scene comprises:

performing the picture rendering based on the interaction data and the motion-capture data, to obtain an initial rendered picture in which the virtual character performs interaction with the second character in the target scene; and performing color-space inverse conversion on the initial rendered picture based on the color mapping relationship, to obtain the picture in which the virtual character performs interaction with the second character in the target scene.

10. The method according to claim 1, wherein the obtaining motion-capture data of a first character in the at least two real characters comprises:

obtaining, when the first character in the at least two real characters wears a motion capture device, position change data that is of a marked point on the motion capture device and that is captured by a real camera, and using the position change data as motion data of the first character, wherein the marked point corresponds to a skeletal key point of the first character;

obtaining, when the first character is mounted with an expression capture device, expression data that is of the first character and that is captured by the expression capture device;

obtaining, when the first character is mounted with a voice collection device, voice data that is of the first character and that is collected by the voice collection device; and determining at least one of the motion data, the expression data, and the voice data that are of the first character as the motion-capture data.

11. The method according to claim 1, wherein the performing picture rendering based on the interaction data and the motion-capture data, to obtain a picture in which the virtual character performs interaction with a second character in the target scene comprises:

performing the picture rendering based on the interaction data, to obtain a first interaction picture in which the at least two real characters perform interaction with each other in the target scene;

creating a space mask corresponding to the first character, and masking the first character in the first interaction picture based on the space mask, to obtain a second interaction picture in which the second character performs interaction with the space mask; and generating the virtual character corresponding to the first character at a position of the space mask, and rendering the virtual character into the second interaction picture based on the motion-capture data, to obtain the picture in which the virtual character performs interaction with the second character in the target scene.

12. An apparatus for rendering an interaction picture, the apparatus comprising:

a processor; and memory storing computer readable instructions that, when executed by the processor, cause the apparatus to:

obtain, from an image capture device comprising a real camera, interaction data of at least two real characters performing interaction with each other in a target scene and motion-capture data of a first character in the at least two real characters, the obtaining the interaction data of the at least two real characters includes:

obtaining original data that is recorded by the real camera of the at least two real characters performing interaction with each other in the target scene, wherein the real camera is mounted on a mechanical arm, and the mechanical arm is connected to the real camera through an end actuator of the mechanical arm;

determining a first coordinate conversion relationship between the real camera and the mechanical arm, and a second coordinate conversion relationship between the mechanical arm and a virtual camera; and mapping the original data based on the first coordinate conversion relationship and the second coordinate conversion relationship, to obtain mapped data of the original data in the virtual camera, and determining the mapped data as the interaction data, the motion-capture data being configured for determining a movement of a virtual character, the virtual character corresponding to the first character, to perform an interactive action consistent with one or more movements of the first character; and perform, using the virtual camera, picture rendering based on the interaction data and the motion-capture data, to generate an image in which the virtual character performs interaction with a second character in the target scene, the second character being a character other than the first character in the at least two real characters.

13. The apparatus according to claim 12, wherein the determining a first coordinate conversion relationship between the real camera and the mechanical arm comprises:

obtaining a third coordinate conversion relationship between the real camera and the end actuator of the mechanical arm, and a fourth coordinate conversion relationship between the end actuator of the mechanical arm and a base coordinate system of the mechanical arm; and determining the first coordinate conversion relationship between the real camera and the mechanical arm based on the third coordinate conversion relationship and the fourth coordinate conversion relationship.

14. The apparatus according to claim 12, wherein the obtaining original data that is recorded by a real camera of the at least two real characters performing interaction with each other in the target scene comprises:

obtaining first scene data of the target scene, wherein the first scene data is scene data that is recorded by the real camera during movement of the mechanical arm along a target trajectory and that does not comprise the at least two real characters;

obtaining second scene data of the target scene, wherein the second scene data is scene data that is recorded by the real camera during the movement of the mechanical arm along the target trajectory when the at least two real characters perform interaction with each other in the target scene and that comprises the at least two real characters; and determining the first scene data and the second scene data as the original data.

15. The apparatus according to claim 14, wherein the obtaining first scene data of the target scene comprises:

receiving a movement instruction for the mechanical arm, wherein the movement instruction is configured for instructing the mechanical arm to move along the target trajectory;

controlling, in response to the movement instruction for the mechanical arm, the mechanical arm to move along the target trajectory; and controlling the real camera to record the first scene data during the movement of the mechanical arm.

16. A non-transitory computer-readable medium storing computer-readable instructions that, when executed, cause an apparatus to:

obtain, from an image capture device comprising a real camera, interaction data of at least two real characters performing interaction with each other in a target scene and motion-capture data of a first character in the at least two real characters, the obtaining the interaction data of the at least two real characters includes:

obtaining original data that is recorded by the real camera of the at least two real characters performing interaction with each other in the target scene, wherein the real camera is mounted on a mechanical arm, and the mechanical arm is connected to the real camera through an end actuator of the mechanical arm;

determining a first coordinate conversion relationship between the real camera and the mechanical arm, and a second coordinate conversion relationship between the mechanical arm and a virtual camera; and mapping the original data based on the first coordinate conversion relationship and the second coordinate conversion relationship, to obtain mapped data of the original data in the virtual camera, and determining the mapped data as the interaction data, the motion-capture data being configured for determining a movement of a virtual character, the virtual character corresponding to the first character, to perform an interactive action consistent with one or more movements of the first character; and perform, using the virtual camera, picture rendering based on the interaction data and the motion-capture data, to generate an image in which the virtual character performs interaction with a second character in the target scene, the second character being a character other than the first character in the at least two real characters.

17. The non-transitory computer-readable medium according to claim 16, wherein the determining a first coordinate conversion relationship between the real camera and the mechanical arm comprises:

obtaining a third coordinate conversion relationship between the real camera and the end actuator of the mechanical arm, and a fourth coordinate conversion relationship between the end actuator of the mechanical arm and a base coordinate system of the mechanical arm; and determining the first coordinate conversion relationship between the real camera and the mechanical arm based on the third coordinate conversion relationship and the fourth coordinate conversion relationship.

* * * * *